United States Patent
Cui et al.

(10) Patent No.: US 9,635,566 B2
(45) Date of Patent: Apr. 25, 2017

(54) ENHANCEMENT OF ACCESS POINTS TO SUPPORT HETEROGENEOUS NETWORKS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Hongyan Lei, Plano, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 162 days.

(21) Appl. No.: 14/261,666

(22) Filed: Apr. 25, 2014

(65) Prior Publication Data

US 2015/0312776 A1    Oct. 29, 2015

(51) Int. Cl.
*H04W 4/00* (2009.01)
*H04W 24/02* (2009.01)
(Continued)

(52) U.S. Cl.
CPC ........... *H04W 24/02* (2013.01); *H04W 48/16* (2013.01); *H04W 28/08* (2013.01);
(Continued)

(58) Field of Classification Search
USPC ....... 370/329, 331, 328, 332, 254, 311, 336, 370/338, 216, 235, 241, 242, 312;
(Continued)

(56) References Cited

U.S. PATENT DOCUMENTS

| 4,737,978 A | 4/1988 | Burke et al. |
| 5,515,419 A | 5/1996 | Sheffer |

(Continued)

FOREIGN PATENT DOCUMENTS

| CN | 102907121 A | 1/2013 |
| EP | 1161802 B1 | 5/2008 |

(Continued)

OTHER PUBLICATIONS

Beming et al. "LTE-SAE architecture and performance." Ericsson Review No. 3, 2007, pp. 98-104.

(Continued)

*Primary Examiner* — Phuongchau Ba Nguyen
(74) *Attorney, Agent, or Firm* — Amin, Turocy & Watson, LLP

(57) ABSTRACT

An interface between access points is enhanced by enabling an exchange of a cell characteristic information element (IE). The cell characteristic information can provide an access point with information about the characteristics/features/capabilities of its neighbor cells. Automatic neighbor relations are also enhanced to store and/or manage the cell characteristic information. Moreover, the cell characteristic information can be utilized by the access point to significantly improve handover (HO) decisions, increase load balancing performance, and/or decrease inter cell interference. The cell characteristic information can also improve network efficiency and avoid bottlenecks during cell reselection in Heterogeneous Networks (HetNets).

20 Claims, 14 Drawing Sheets

(51) Int. Cl.
*H04W 48/16* (2009.01)
*H04W 28/08* (2009.01)
*H04W 92/20* (2009.01)
*H04W 48/12* (2009.01)
*H04W 36/00* (2009.01)

(52) U.S. Cl.
CPC ........ *H04W 36/0083* (2013.01); *H04W 48/12* (2013.01); *H04W 92/20* (2013.01)

(58) Field of Classification Search
USPC ...... 455/436, 434, 437, 422.1, 404.1, 435.1, 455/452.1, 426.1, 435.2, 438, 444, 456.1, 455/456.3, 552.1, 67.11, 406, 414.1, 455/414.2, 423, 435.3, 439, 445, 450, 455/509, 522, 550.1, 574, 63.1
See application file for complete search history.

(56) References Cited

U.S. PATENT DOCUMENTS

| | | | |
|---|---|---|---|
| 5,577,168 | A | 11/1996 | Haas et al. |
| 5,854,981 | A | 12/1998 | Wallstedt et al. |
| 5,953,667 | A | 9/1999 | Kauppi |
| 6,167,274 | A | 12/2000 | Smith |
| 6,289,220 | B1 | 9/2001 | Spear |
| 6,360,094 | B1 | 3/2002 | Satarasinghe |
| 6,445,917 | B1 | 9/2002 | Bark et al. |
| 6,839,565 | B2 | 1/2005 | Sarkkinen et al. |
| 7,130,627 | B2 | 10/2006 | Lundh et al. |
| 7,283,816 | B2 | 10/2007 | Fok et al. |
| 7,298,327 | B2 | 11/2007 | Dupray et al. |
| 7,369,861 | B2 | 5/2008 | Vare |
| 7,555,300 | B2 | 6/2009 | Scheinert et al. |
| 7,812,766 | B2 | 10/2010 | Leblanc et al. |
| 7,817,997 | B2 | 10/2010 | Nylander et al. |
| 7,995,988 | B2 | 8/2011 | Filizola et al. |
| 8,032,153 | B2 | 10/2011 | Dupray et al. |
| 8,169,931 | B2 | 5/2012 | Hui et al. |
| 8,185,124 | B2 | 5/2012 | Antic et al. |
| 8,194,579 | B2 | 6/2012 | Lee et al. |
| 8,254,982 | B2 | 8/2012 | Kuningas |
| 8,265,618 | B2 | 9/2012 | MacNaughtan et al. |
| 8,306,540 | B2 | 11/2012 | Hsieh et al. |
| 8,311,001 | B2 | 11/2012 | Kimura et al. |
| 8,325,684 | B2 | 12/2012 | Pani et al. |
| 8,331,939 | B2 | 12/2012 | Chen |
| 8,358,982 | B2 | 1/2013 | Van Der Velde et al. |
| 8,401,544 | B2 | 3/2013 | Fried et al. |
| 8,422,956 | B2 | 4/2013 | Narasimha et al. |
| 8,467,351 | B2 | 6/2013 | Liu et al. |
| 8,543,123 | B2 | 9/2013 | Moon et al. |
| 8,571,594 | B2 | 10/2013 | Luo et al. |
| 8,576,742 | B2 | 11/2013 | Yoo et al. |
| 8,582,530 | B2 | 11/2013 | Binzel et al. |
| 8,594,011 | B2 | 11/2013 | Wang et al. |
| 8,615,199 | B2 | 12/2013 | Han et al. |
| 8,755,316 | B2 | 6/2014 | Aschan et al. |
| 8,914,028 | B2 | 12/2014 | Gayde et al. |
| 8,977,268 | B2 | 3/2015 | Sivanesan et al. |
| 9,008,659 | B1 | 4/2015 | Choi et al. |
| 9,185,620 | B2 | 11/2015 | Khoryaev et al. |
| 2007/0287444 | A1 | 12/2007 | Hulkkonen et al. |
| 2009/0067386 | A1 | 3/2009 | Kitazoe |
| 2009/0098885 | A1 | 4/2009 | Gogic et al. |
| 2009/0137249 | A1 | 5/2009 | Horn et al. |
| 2010/0184434 | A1 | 7/2010 | Jeong et al. |
| 2010/0234061 | A1 | 9/2010 | Khandekar et al. |
| 2011/0039575 | A1 | 2/2011 | Castillo et al. |
| 2011/0064059 | A1 | 3/2011 | Hooli et al. |
| 2011/0188481 | A1 | 8/2011 | Damnjanovic et al. |
| 2011/0216732 | A1 | 9/2011 | Maeda et al. |
| 2011/0249642 | A1 | 10/2011 | Song et al. |
| 2011/0270994 | A1 | 11/2011 | Ulupinar et al. |
| 2011/0294527 | A1* | 12/2011 | Brueck ................ H04W 24/02 455/466 |
| 2011/0319028 | A1 | 12/2011 | Magadi Rangaiah et al. |
| 2011/0319110 | A1* | 12/2011 | Futaki .................. H04W 24/02 455/507 |
| 2012/0014333 | A1 | 1/2012 | Ji et al. |
| 2012/0033570 | A1 | 2/2012 | He et al. |
| 2012/0113812 | A1 | 5/2012 | Ji et al. |
| 2012/0115469 | A1 | 5/2012 | Chen et al. |
| 2012/0149362 | A1 | 6/2012 | Tooher et al. |
| 2012/0157082 | A1 | 6/2012 | Pedersen et al. |
| 2012/0282864 | A1 | 11/2012 | Dimou et al. |
| 2013/0033998 | A1 | 2/2013 | Seo et al. |
| 2013/0077553 | A1 | 3/2013 | Nielsen et al. |
| 2013/0142110 | A1 | 6/2013 | Li et al. |
| 2013/0165142 | A1 | 6/2013 | Huang |
| 2013/0170362 | A1 | 7/2013 | Futaki et al. |
| 2013/0196675 | A1 | 8/2013 | Xiao et al. |
| 2013/0217385 | A1 | 8/2013 | Das et al. |
| 2013/0223393 | A1 | 8/2013 | Jung et al. |
| 2013/0225169 | A1 | 8/2013 | Farnsworth et al. |
| 2013/0244709 | A1 | 9/2013 | Davydov et al. |
| 2013/0267230 | A1 | 10/2013 | Lin et al. |
| 2013/0315092 | A1 | 11/2013 | Yu et al. |
| 2013/0315157 | A1 | 11/2013 | Krishnamurthy et al. |
| 2013/0343315 | A1 | 12/2013 | Tiirola et al. |
| 2014/0135028 | A1 | 5/2014 | Wang et al. |
| 2014/0198744 | A1 | 7/2014 | Wang et al. |
| 2015/0038140 | A1 | 2/2015 | Kilpatrick, II et al. |
| 2015/0264622 | A1 | 9/2015 | Ueda |

FOREIGN PATENT DOCUMENTS

| | | |
|---|---|---|
| EP | 2132949 A1 | 12/2009 |
| EP | 2575391 A1 | 4/2013 |
| EP | 2688352 A1 | 1/2014 |
| EP | 2749077 A1 | 7/2014 |
| GB | 2494107 A | 3/2013 |
| GB | 2498927 A | 8/2013 |
| JP | 2011244435 A | 12/2011 |
| JP | 2012044658 A | 3/2012 |
| JP | 2012105176 A | 5/2012 |
| JP | 2013038720 A | 2/2013 |
| WO | 2008055132 A2 | 5/2008 |
| WO | 2010151016 A2 | 12/2010 |
| WO | 2011136565 A2 | 11/2011 |
| WO | 2012015411 A1 | 2/2012 |
| WO | 2012024454 A1 | 2/2012 |
| WO | 2012140470 A1 | 10/2012 |
| WO | 2013066877 A1 | 5/2013 |
| WO | 2013138988 A1 | 9/2013 |
| WO | 2013185354 A1 | 12/2013 |

OTHER PUBLICATIONS

Nandini Deb. "An Internship Experience Report on Heterogeneous Networks." Amity Institute of Telecom Technology & Management, May-Jul. 2013, 94 pages.

Holma et al. "LTE for UMTS—OFDMA and SC-FDMA Based Radio Access." John Wiley & Sons, Ltd., 2009, 450 pages.

Holma et al. "LTE for UMTS Evolution to LTE-Advanced Second Edition." John Wiley & Sons, Ltd., 2011, 559 pages.

Reed et al. "Spectrum Access Technologies: The Past, the Present, and the Future." Proceedings of the IEEE | vol. 100, May 13, 2012, pp. 1676-1684.

Schwarz et al. "Pushing the Limits of LTE: A Survey on Research Enhancing the Standard." IEEE Access, vol. 1, May 10, 2013, pp. 51-62.

Siddiqui et al. "Broadband Wireless Technologies." Next-Generation Wireless Technologies Computer Communications and Networks 2013. pp. 71-103.

Vetter et al. "Enablers for Energy-Aware Cooperative Decision and Control." FP7 Information & Communication Technologies (ICT), COoperative and Self growing Energy awaRe Networks—CONSERN, Oct. 31, 2010, 56 pages.

"Backhauling X2." Cambridge Broadband Networks Limited, Dec. 4, 2010, 13 pages.

(56) References Cited

OTHER PUBLICATIONS

Cackov et al. "Simulation and Performance Evaluation of a Public Safety Wireless Network: Case Study." Simulation, vol. 81, Issue 8, Aug. 2005, pp. 571-585.
Dietl et al."Location Information Service for Heterogeneous Mobile Networks—Location Trader Project." Center for Digital Technology and Management, 2006, 89 pages.
Zerfos et al. "DIRAC: A Softwarebased Wireless Router System." MobiCom'03, Sep. 14-19, 2003, 15 pages.
Wang et al. "Intersystem Location Update and Paging Schemes for Multitier Wireless Networks." MOBICOM 2000, pp. 99-109.
Zeng et al. "Worldwide Regulatory and Standardization Activities on Cognitive Radio." 2010 IEEE Symposium on New Frontiers in Dynamic Spectrum, Apr. 6-9, 2010, 9 pages.
Berger et al. "On the Advantages of Location Resolved Input Data for Throughput Optimization Algorithms in Self-Organizing Wireless Networks." Proceedings of the WS—BWA IEEE Global Communications Conference 2011 (GLOBECOM'13), Atlanta, GA, Sep. 12-Sep. 12, 2013, 5 pages.
He et al. "An Optimal Approach for Load Balancing in Heterogeneous LTE Advanced." Third Nordic Workshop on System & Network Optimization for Wireless, Apr. 10-12, 2012, 1 page.
Ilmenau University of Technology. "Load Balancing." International Graduate School on Mobile Communications. IEEE 72nd Vehicular Technology Conference (VTC2010—Fall) (Ottawa, Canada, 2010). 19 pages.
Lobinger et al. "Load Balancing in Downlink LTE Self-Optimizing Networks." 2010 IEEE 71st Vehicular Technology Conference (VTC 2010—Spring), May 16-19, 2010, 5 pages.
Rosenberger et al. "Ruled-based Algorithms for Self-x Functionalities in Radio Access Networks." ICT-MobileSummit 2009 Conference Proceedings, 8 pages.
Siomina et al. "Load balancing in heterogeneous LTE: Range optimization via cell offset and load-coupling characterization" Communications (ICC), 2012 IEEE International Conference on Jun. 10-15, 2012, pp. 1357-1361.
LTE Advanced: HetNet eICIC/IC, qualcomm.com. 2013. Published online at [http://www.qualcomm.com/research/projects/lte-advanced/hetnets], retrieved on Jul. 15, 2014, 2 pages.
A Comparison of LTE Advanced HetNets and WiFi, Qualcomm Incorporated, Oct. 2011, published online at[http://www.qualcomm.com/media/documents/comparison-lte-advancedhetnets-and-wifi], Retrieved on Jul. 15, 2014, 16 pages.
Ghadialy, "Further enhanced Inter-Cell Interference Coordination (FeICIC)," The 3G4G Blog, May 1, 2014. published online at [http://blog.3g4g.co.uk/2014/05/further-enhanced-inter-cell.html], retrieved on Jul. 15, 2014, 9 pages.
Seymour, "Essential Elements of Rel-10 and Rel-11 LTE-Advanced," LTE-Advanced: Understanding 3GPP Release 10 and Beyond, Workshop presented by 4G Americas, Presentation Slide, Oct. 22, 2012, Alcatel-Lucent. published online at [http://www.4gamericas.org/UserFiles/file/Presentations/Essential%20Elements%20of%20Rel-10%20and%20Rel-11%20LTE%20Advanced%20Jim%20Seymour%20Alcatel-Lucent.pdf], retrieved on Jul. 22, 2014, 13 pages.
Merwaday, et al., "Capacity Analysis of LTE-Advanced HetNets with Reduced Power Subframes and Range Expansion," arXiv preprint arXiv:1403.7802, 2014. published online at [http://arxiv.org/pdf/1403.7802], retrieved on Jul. 22, 2014, 34 pages.
Li, et al, "CoMP and interference coordination in heterogeneous network for LTE-Advanced," Globecom Workshops, IEEE, 2012, 5 pages.
Jungnickel, et al. "The Role of Small Cells, Coordinated Multi-Point and Massive MIMO in 5G" published online at [https://www.metis2020.com/wpcontent/uploads/publicationsIEEE_2014_Jungnickel_etal_Small_cells_in_5G.pdf], retrieved Jul. 21, 2014, 11 pages.
Non-Final Office Action mailed Mar. 2, 2016 for U.S. Appl. No. 14/505,129, 38 pages.
Non-Final Office Action mailed Mar. 17, 2016 for U.S. Appl. No. 14/261,696, 48 pages.
Final Office Action mailed Jul. 11, 2016 for U.S. Appl. No. 14/505,129, 33 pages.
Final Office Action mailed Jul. 25, 2016 for U.S. Appl. No. 14/505,129, 29 pages.
Notice of Allowance mailed Dec. 5, 2016 for U.S. Appl. No. 14/505,129, 32 pages.

* cited by examiner

ENHANCEMENT OF ACCESS POINTS TO SUPPORT HETEROGENEOUS NETWORKS

CROSS REFERENCE TO RELATED APPLICATIONS

This application is related to U.S. patent application Ser. No. 14/261,696 (issued as U.S. Pat. No. 9,516,564), filed on Apr. 25, 2014, entitled "ENHANCEMENT OF A CELL RESELECTION PARAMETER IN HETEROGENEOUS NETWORKS." The entirety of the foregoing application is incorporated herein by reference.

TECHNICAL FIELD

The subject disclosure relates to wireless communications, e.g., to an enhancement of access points to support heterogeneous networks.

BACKGROUND

With an explosive growth in utilization of communication devices, mobile telecommunications carriers are seeing an exponential increase in network traffic. To meet the demands of higher traffic and/or improve the end user experience, conventional systems deploy metro cells (e.g., small cells) that improve network coverage and capacity by offloading mobile traffic between overlapping cells.

Heterogeneous networks (HetNets) comprise different types of cells (e.g., metro cells, macro cells, femtocells etc.) having overlapped coverage areas. Size information associated with the different types of cells is extracted by a serving access point from history information stored within a user equipment (UE). The history information comprises information about cells that have previously served the UE and includes size information indicative of a size of a coverage area of the cell. Moreover, the history information is transferred from the UE to the serving access point within a handover request message. On receiving the handover request message, the serving access point extracts the size information and sorts the information based on reports/history information received from multiple UEs leading to increased processing and complexity, and reduced accuracy.

DETAILED DESCRIPTION

Figure 1:
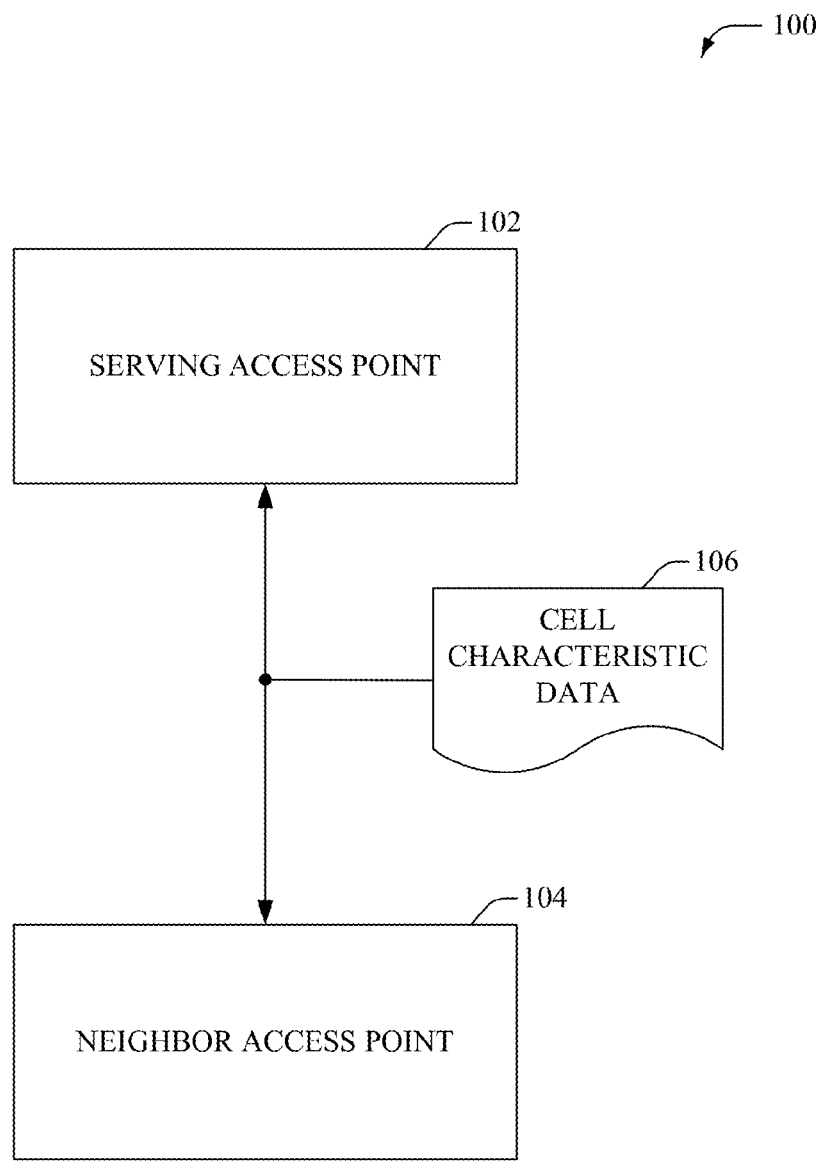
FIG. 1 illustrates an example system that facilitates an exchange of cell characteristic data between access points of a communication network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "point," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile terminal," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

The systems and methods disclosed herein facilitate enhancing an interface between access points by enabling an exchange of a cell-type/cell profile information element (IE). The cell-type/cell profile IE can provide an access point with information about the characteristics of its neighbor cells. Moreover, this information can be utilized by the access point to significantly improve handover (HO) decisions, increase load balancing performance, and/or reduce inter cell interference. The systems and methods can also improve network efficiency and avoid bottlenecks during cell reselection in Heterogeneous Networks (HetNet). HetNets include different types of access nodes/cells in a wireless network. For example, macro cells, metro cells, femtocells, and/or pico cells can be deployed within a HetNet. It can be noted that WiFi access points can also be part of a HetNet. As an example, aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the disclosed subject matter can be exploited in legacy (e.g., wireline) telecommunication technologies and/or future telecommunication technologies (e.g., 5G, white space networks, etc.).

Referring initially to FIG. 1, there illustrated is an example system 100 that facilitates an exchange of cell characteristic data between access points of a communication network, according to one or more aspects of the disclosed subject matter. System 100 can be part of a heterogeneous communication network (e.g., heterogeneous network (HetNet)) and can include a serving access point 102 and one or more neighbor access points 104, for example, that are located within a defined distance from the serving access point 102. As an example, the serving access point 102 and the neighbor access point 104 can be considered as neighboring access points if the coverage areas of the serving access point 102 and the neighbor access point 104 at least partially overlap (e.g., to facilitate handover/cell reselection between the cell sites), if the locations of the serving access point 102 and the neighbor access point 104 satisfy a defined location criterion (e.g., are within a defined distance), if the serving access point 102 and the neighbor access point 104 share a common cell edge, etc. In one aspect, the serving access point 102 and/or the one or more neighbor access points 104 can be part of a self-optimizing network (SON). As an example, the access points (102, 104) can include, but are not limited to, a base station, an eNodeB (eNB), a pico station, a WiFi access point, a femto access point, a HomeNodeB (HNB), home eNB (HeNB), etc.

According to an aspect, cell characteristic data 106 can be exchanged between the serving access point 102 and the neighbor access point 104. Moreover, the serving access point 102 can provide the neighbor access point 104 with data representing characteristics/features/capabilities of the serving access point 102 and the neighbor access point 104 can provide the serving access point 102 with data representing characteristics/features/capabilities of the neighbor access point 104. In one example, access points within a HetNet can typically have different characteristics, for example, based on their cell-types (e.g., macro cell, femtocell, metro cell, pico cell, etc.). HetNets typically comprise of different type of cells and/or access points that can utilize the same or different communication protocols. In an aspect, access points (102,104) can include macro cells and/or metro cells that have significantly different characteristics. For example, a metro cell can have a lower output power and smaller coverage area than a macro cell.

According to aspect, the cell characteristic data can include, but is not limited to, cell-type data (e.g., macro cell, metro cell, small cell, pico cell, femtocell, etc.) and/or cell-profile data (e.g., antenna tilt/pattern, power level, multiple input multiple output (MIMO) antenna configuration, carrier aggregation, indoor/outdoor location, public/private access, cell capacity, number and/or types of technologies supported, etc.). For example, the serving access point 102 can receive, from the neighbor access point 104, a cell-type indicator representing the type of the cell served by the neighbor access point 104, e.g., "macro cell," "femtocell," metro cell," "small cell," "pico cell," etc. (and/or vice versa). In one aspect, a direct interface (e.g., logical or physical) can be setup between the serving access point 102 and the neighbor access point 104 and the cell characteristic data 106 can be transmitted between the access points (104,104) during (as part of) setting up the interface. For example, the interface can be a peer-to-peer logical interface. It can be noted that the cell characteristic data 106 can also be transmitted between the access points (104,104) at most any time subsequent to setup and/or initialization of the interface. In one aspect, the cell characteristic data 106 can be utilized by the serving access point 102 and/or the neighbor access point 104 to improve handover (HO)/cell reselection decisions, increase load balancing performance and/or reduce call drop rate.

Figure 2:
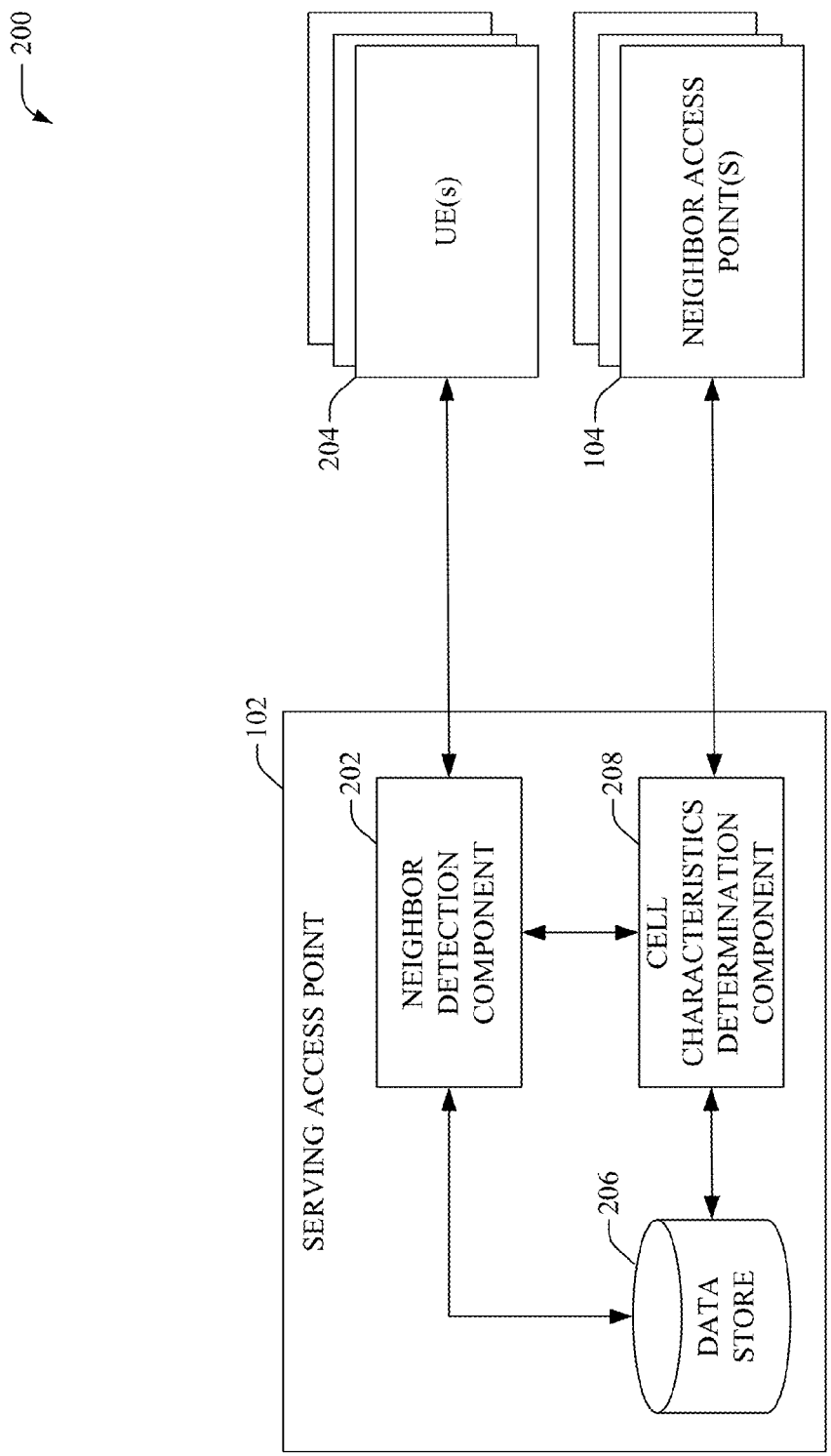
FIG. 2 illustrates an example system for determining cell characteristic data.

Referring now to FIG. 2, there illustrated is an example system 200 for determining cell characteristic data, in accordance with an aspect of the subject disclosure. It is noted that the serving access point 102 and the neighbor access point(s) 104 can include access points of most any cell-type (e.g., different or the same cell-type), such as but not limited to a macro access point, a femto access point, a pico station, etc. and can include functionality as more fully described herein, for example, as described above with regard to system 100.

The serving access point 102 comprises a neighbor detection component 202 that facilitates a determination of access points that are neighboring the serving access point 102 (e.g., neighbor access point(s) 104). In one aspect, the neighbor detection component 202 can receive data identifying the neighbor access point(s) 104 from one or more UE(s) 204 served by the serving access point 102. Moreover, the neighbor detection component 202 can instruct the UE(s) 204 to perform measurements (e.g., automatic neighbor relation (ANR) measurements) to detect and report the neighbor access point(s) 104. For example, the neighbor detection component 202 can instruct (e.g., via a set of radio resource control (RRC) messages) the UE(s) 204 to ascertain an identifier (e.g., a global ID) of a neighbor cell. Further, the neighbor detection component 202 can receive the identifier from the UE(s) 204 and store the identifier data in a data store 206. In another aspect, the neighbor detection component 202 can receive the identifier data (e.g., a global ID) representing the neighbor access point(s) 104 from an operation/management network device (not shown) and store the identifier data in the data store 206. It is noted that the data store 206 can include volatile memory(s) or non-volatile memory(s), or can include both volatile and non-volatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

According to an embodiment, a cell characteristics determination component 208 can be utilized to determine cell characteristic data associated with the access points (e.g., neighbor access point(s) 104) having their identifiers stored in the data store 206. As an example, the cell characteristic data can include, but is not limited to, cell-type (e.g., macro, metro, femto, etc.), antenna tilt/pattern, transmission power level, MIMO configuration, carrier aggregation, indoor/outdoor location, public/private access, cell capacity, number and/or types of technologies supported, etc. Moreover, it can be noted that the cell-type can represent a capability (ies)/characteristic(s) of the cell and is not limited to a size-related/power-related classification. In addition to differences in size (e.g., coverage areas), macro and metro cells have different features/capability (e.g., indoor vs. outdoor deployment, public vs. private access, etc.). Further, cells that are classified within the same size category (e.g., small cells) can have different power levels (e.g., 1 W, 5 W, etc.) and/or features and thus, different cell-types. As an example, the type of a cell can represent the cell's capacity (e.g., number of UEs supported by the cell; a macro cell can support thousands of UEs; a metro cell can support tens to hundreds of UEs; a consumer femto cell can support 1-10 UEs). When a macro access point performs load balancing, cell-type of its neighboring access points is a significant factor that can be considered to improve load balancing performance. In another example, the type of a cell can represent whether the cell is part of a Closed Subscriber Group (CSG). This feature of small cells can be turned on if some enterprise customers want to limit the small cell access to their own users. Macro cells are not part of CSGs and can always be publicly accessed. Further, multi-technology cells can be identified. For example, cells that support cellular technology along with WiFi technology can be identified. Furthermore, cell-profile data can include parameters such as, but not limited to, transmission power level, antenna pattern, antenna tilt, MIMO configuration, carrier aggregation, etc.

In one aspect, the cell characteristics determination component 208 can request and/or receive the cell characteristic data from the access points (e.g., neighbor access point(s) 104), for example, during (or subsequent to) establishment of a peer-to-peer (P2P) link (e.g., X2 interface) between the serving access point 102 and the respective access points. In another aspect, the cell characteristics determination component 208 can request and/or receive the cell characteristic data from a network device (not shown). In yet another aspect, the cell characteristics determination component 208 can determine the cell characteristic data from history information received from the UE(s) 204. The cell characteristics determination component 208 can store the cell characteristic data in data store 206 (and/or most any other internal or remote data store) such that the cell characteristic data can be utilized by the serving access point 102 to increase efficiency during HOs decisions and/or load balancing, and/or decrease call drop rate.

It can be noted that, the UE(s) 204 can include most any electronic communication devices such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UE(s) 204 can also include, LTE-based devices, such as, but not limited to, most any home or commercial appliance that includes an LTE radio. It can be noted that UE(s) 204 can be mobile, have limited mobility and/or be stationary. In one example, UE(s) 204 can include a multi-band, multi-mode, and/or multi-radio device.

Figure 3A:
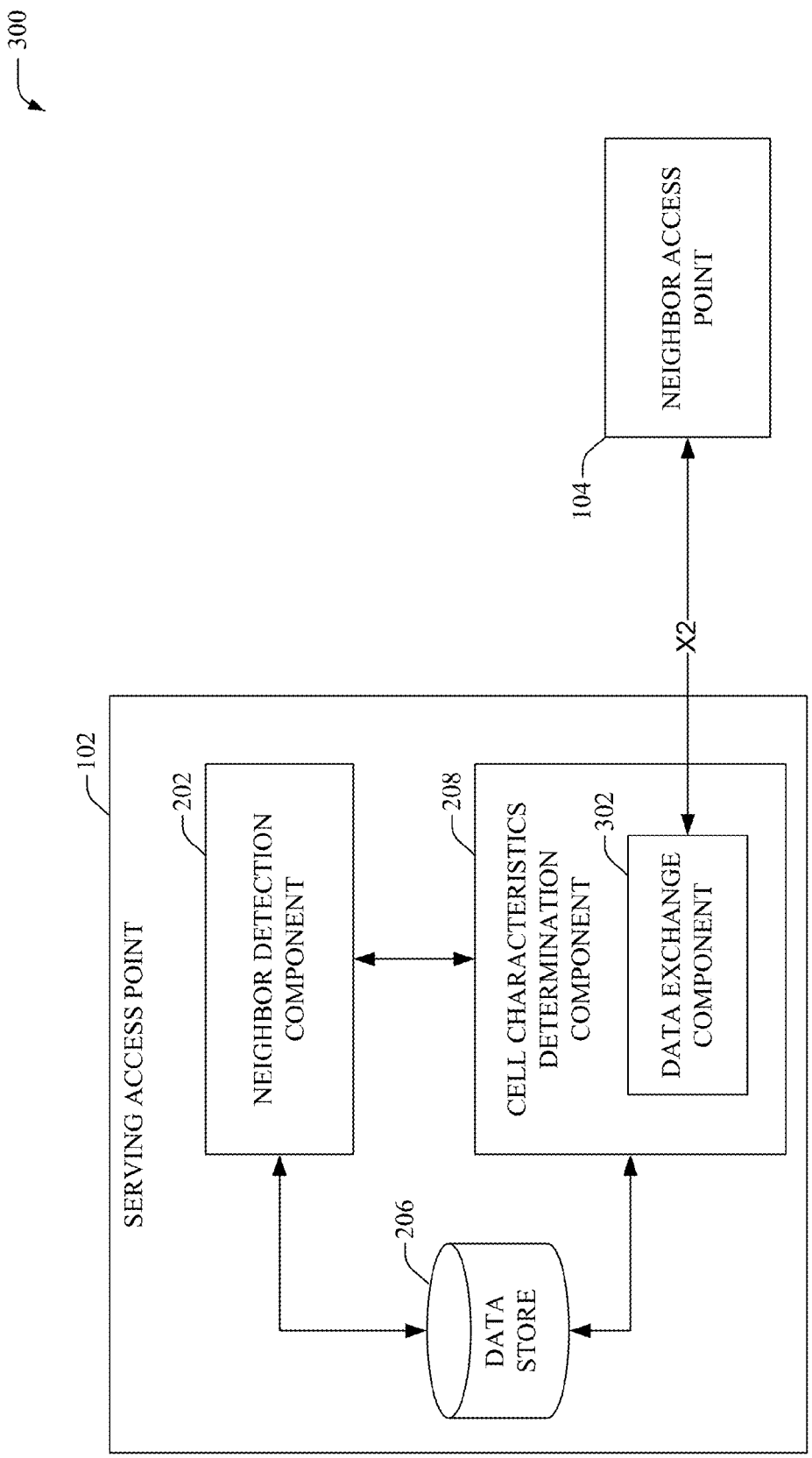
FIGS. 3A-3C illustrate example systems that facilitate a transfer of cell characteristic data between access points of a communication network.
Figure 3B:
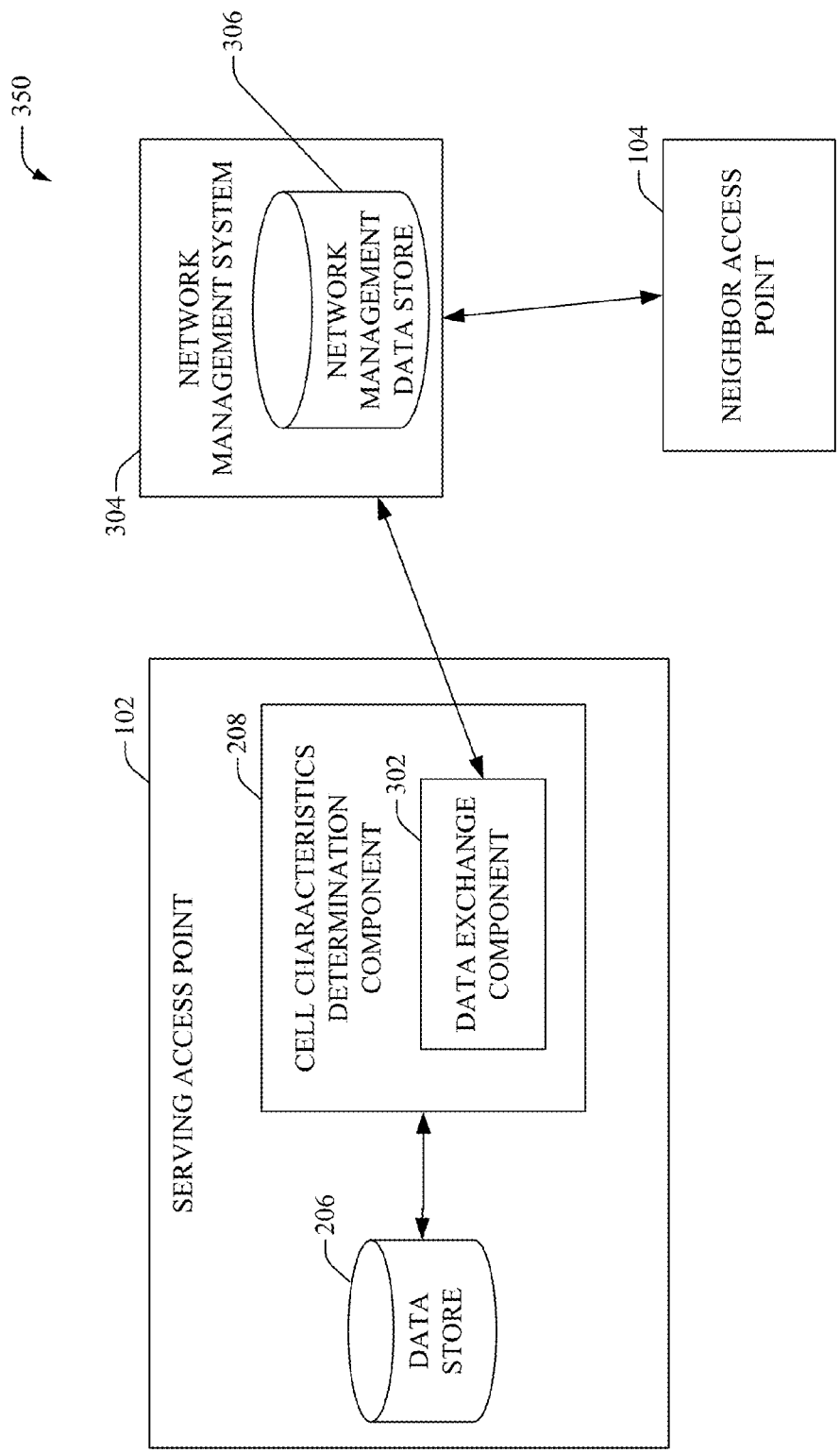
Figure 3C:
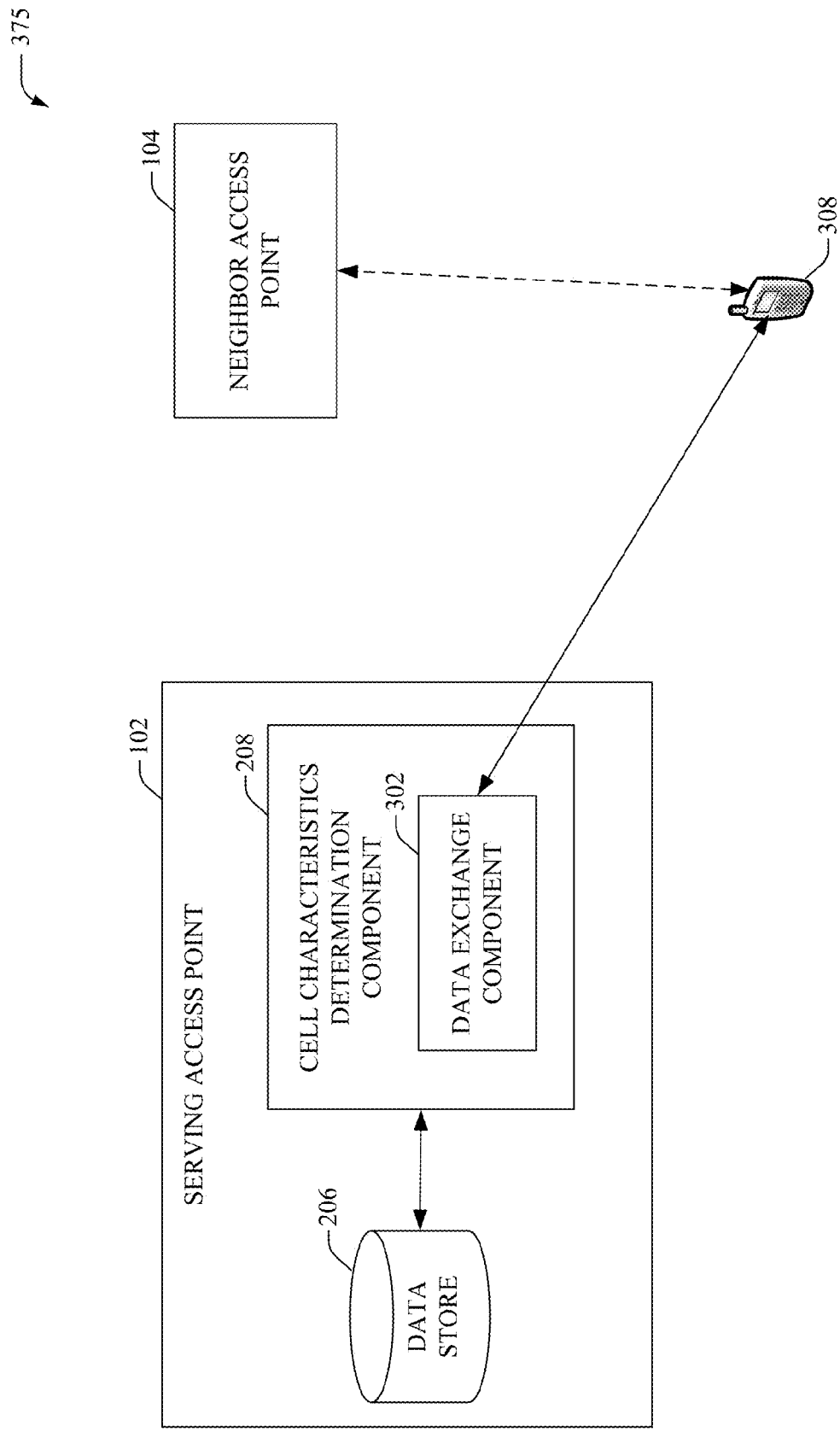

Referring now to FIGS. 3A-3C, there illustrated are example systems (300, 350, 375) that facilitate a transfer of cell characteristic data between access points of a communication network (e.g., cellular network, HetNet, etc.), according to an aspect of the subject disclosure. It is noted that the serving access point 102, the neighbor access point 104, the neighbor detection component 202, the data store 206 and the cell characteristics determination component 208 can include functionality as more fully described herein, for example, as described above with regard to systems 100 and 200. In one example, one or more of the neighbor access points 104 can include, but is not limited to an access point that is operated and/or deployed by a service provider of the communication network that operates and/or deploys the serving access point 102, and that utilizes the same or different radio technologies for communication with the UEs (e.g., UEs 204) as utilized by serving access point 102.

FIG. 3A illustrates example system 300 that depicts a transmission of cell characteristic data between the neighbor access point 104 and the serving access point 102 via a P2P interface (e.g., utilizing a control plane protocol). As an example, an access point-to-access point signaling protocol, such as (but not limited to) an X2-application protocol (AP) on the X2 interface can be utilized for the transmission. It can be noted that the X2 interface can be a logical interface between neighbor access points and is not limited to a dedicated physical connection between access points. The X2 interface can couple access points via the existing IP transport network. For lowest latency and minimum loading of the transport network, the path of the physical X2 connection can be kept as short as possible, for example, by utilizing point-to-multipoint backhaul links. However, it is to be noted that the backhaul link can have most any configuration (e.g., point-to-point).

In an aspect, the cell characteristic data of the neighbor access point 104 can be transmitted to the serving access point 102 and/or the cell characteristic data of the serving access point can be transmitted to the neighbor access point 104. According to an embodiment, serving access point 102 can include a data exchange component 302 that can facilitate a transmission of the cell characteristic data between the serving access point 102 and the neighbor access point 104. In one example, the data exchange component 302 can initiate and/or establish an X2 interface that employs X2-application protocol (X2AP) to communicate between the serving access point 102 and the neighbor access point 104. The X2AP protocol can provide at least the following functions: (i) Mobility Management (e.g., enabling the access points (102, 104) to handover a specific user equipment to another access point); (ii) Load Management (e.g., enabling the access points (102, 104) to indicate resource status, overload, and/or traffic load to each other); (iii) Reporting of General Error Situations (e.g., enabling the access points (102, 104) to report general error situations to each other); (iv) Resetting the X2 (e.g., enabling the access points (102, 104) to reset the X2 interface and/or implicitly perform an X2 Reset); (v) Setting up the X2 (e.g., enabling the access points (102, 104) to facilitate establishment of the X2 interface); (vi) Configuration Update (e.g., enabling the access points (102, 104) to update application level data utilized for interoperation over the X2 interface); (vii) Mobility Parameters Management (e.g., enabling the access points (102, 104) to coordinate adaptation of mobility parameter settings); (viii) Mobility Robustness Optimization (e.g., enabling the access points (102, 104) to report information related to a mobility failure event); (ix) Energy Saving (e.g., enabling the access points (102, 104) to decrease energy consumption); etc.

In one example, the data exchange component 302 can initiate an X2 Setup procedure to facilitate exchange application level configuration data needed for the serving access point 102 and the neighbor access point 104 to interoperate correctly over the X2 interface. In addition to exchange of the application level configuration data, the initiation of X2 Setup procedure can delete any existing application level configuration data in the two access points (102, 104) and replace it by the received data. As an example, the serving access point 102 can initiate the setup procedure by sending a setup request message to the neighbor access point 104 and in response, the neighbor access point 104 can send a setup reply message to the serving access point 102. In one aspect, the setup request message can comprise cell characteristic data of the serving access point 102 and the setup reply message can comprise cell characteristic data of the neighbor access point 104. Additionally or alternatively, the data exchange component 302 can facilitate the transmission of the cell characteristic data after the X2 interface has been set up between the serving access point 102 and the neighbor access point 104. Further, the data exchange component 302 can transmit/receive updates to the cell characteristic data. It can be noted that the cell characteristic data can be transmitted at most any time, such as, but not limited to, periodically, on-demand, in response to an event (e.g., change in cell-profile data, addition of the access point to the network, etc.), at a predefined time, etc. In one embodiment, the data exchange component 302 can include or append the cell characteristic data within or to an X2 Setup request message and/or X2 Setup response message that are exchanged during initialization of the X2 interface. Alternatively, the data exchange component 302 can transmit the cell characteristic data as a new/separate message.

As discussed supra, the cell characteristic data can represent capabilities of an access point/cell. For example, the cell characteristic data can specify whether the cell is a macro cell, metro cell, femtocell, pico cell, etc. Further, the cell characteristic data can provide additional information regarding the access point/cell, such as, but not limited to, antenna tilt/pattern, power level, MIMO configuration, carrier aggregation, indoor/outdoor location, public/private access, capacity, number and/or types of technologies supported, etc. This information can be utilized to facilitate HOs and/or load balancing.

Referring now to FIG. 3B, there illustrated is an example system 350 that facilitates transmission of cell characteristic data via a network management device, according to one or more aspects of the disclosed subject matter. In one aspect, a network management system 304 of the communication network can receive (e.g., via a push or pull configuration) cell characteristic data associated with the serving access point 102 and/or the neighbor access point 104. It can be noted that the network management system 304 can be locally coupled to the serving access point 102 and/or the neighbor access point 104, for example, located within the radio access network (RAN) (e.g., be part of the self optimizing network (SON)) or can be located elsewhere within the communication network. Moreover, the network management system 304 can store data received from one or more access points, including the neighbor access point 104, in a network management data store 306. This stored data can be accessed by the serving access point 102, for example, if the serving access point 102 does not directly receive the cell characteristic data from the neighbor access point 104.

According to an aspect, the data exchange component 302 can initiate a query for the cell characteristic data. As an example, the query can be transmitted periodically (e.g., based on predefined timing intervals), on-demand, in response to an event (e.g., detection of neighbor access point 104), etc. In response to receiving the query, the network management system 304 can identify access points that are neighboring the serving access point 102 (including neighbor access point 104), lookup cell characteristic data received from the neighboring access points in the network management data store 306, and transmit the data to the serving access point 102. In an aspect, the query generated by the data exchange component 302 can include data such as (but not limited to) the served physical cell ID (PCI) of the serving access point 102, the cell identifier (ID) associated with the serving access point 102, the Basic Service Set IDentifier (BSSID) and/or the Service Set Identifier (SSID). Based on the PCI/SSID/BSSID, the network management system 304 can identify the network sectors corresponding to the serving access point 102 and/or the one or more neighboring access points (e.g., neighbor access point 104), dynamically determine (and/or lookup) the corresponding cell characteristic data, and transmit the determined data to the serving access point 102. The serving access point 102 can receive the cell characteristic data (e.g., via the data exchange component 302), store the cell characteristic data (e.g., via the data store 206) and analyze the cell-type/cell-profile data to facilitate load balancing, improve handover decisions and/or decrease inter cell interference.

Referring now to FIG. 3C, there illustrated is an example system 375 that facilitates transmission of cell characteristic data via a UE 308, according to one or more aspects of the disclosed subject matter. UE 308 can be substantially similar to UE(s) 204 and can include functionality as more fully described herein, for example, as described above with regard to UEs 204. In one aspect, the data exchange component 302 can receive (e.g., via a push or pull configuration) enhanced UE history information from UE 308. The enhanced UE history information can be received during registration/attachment of the UE 308 with the serving access point 102, periodically (e.g., based on predefined timing intervals), on-demand, in response to an event, etc. As an example, the enhanced UE history information can comprise cell characteristic data associated with cells (e.g., including a neighboring cell corresponding to the neighbor access point 104) that the UE 308 has been served by in an active state, prior to the UE 308 attaching/registering with the serving access point 102. In one aspect, the cell characteristic data can be included within and/or be appended to the enhanced UE history information. For example, the cell characteristic can include cell-type data that specifies whether the cell is a macro cell, metro cell, femtocell, pico cell, etc. Optionally or additionally, the cell characteristic can include cell-profile data that provides additional information regarding the access point/cell, such as, but not limited to, antenna tilt/pattern, power level, MIMO configuration, carrier aggregation, indoor/outdoor location, public/private access, capacity, number and/or types of technologies supported, etc.

In an aspect, the data exchange component 302 can parse the UE history information to extract the cell characteristic data. The extracted information can be stored in the data store 206. Further, the stored data can be utilized to manage neighbor relations, improve HO decisions and/or load balancing between the serving access point 102 and the neighboring access points (e.g., including neighbor access point 104). It is noted that systems 300 and 350 can transfer cell characteristic data more efficiently as compared to system 375. Receiving the cell characteristic data via UE history information can increase signaling overhead due to receiving the same content from different UEs and/or each time the UE 308 couples to the serving access point device 102. However, since the cell characteristic data does not change often, it can be more efficient to exchange it less frequently (e.g., once, periodically, on demand, etc.), for example, as depicted in systems 300 and/or 350.

Figure 4:
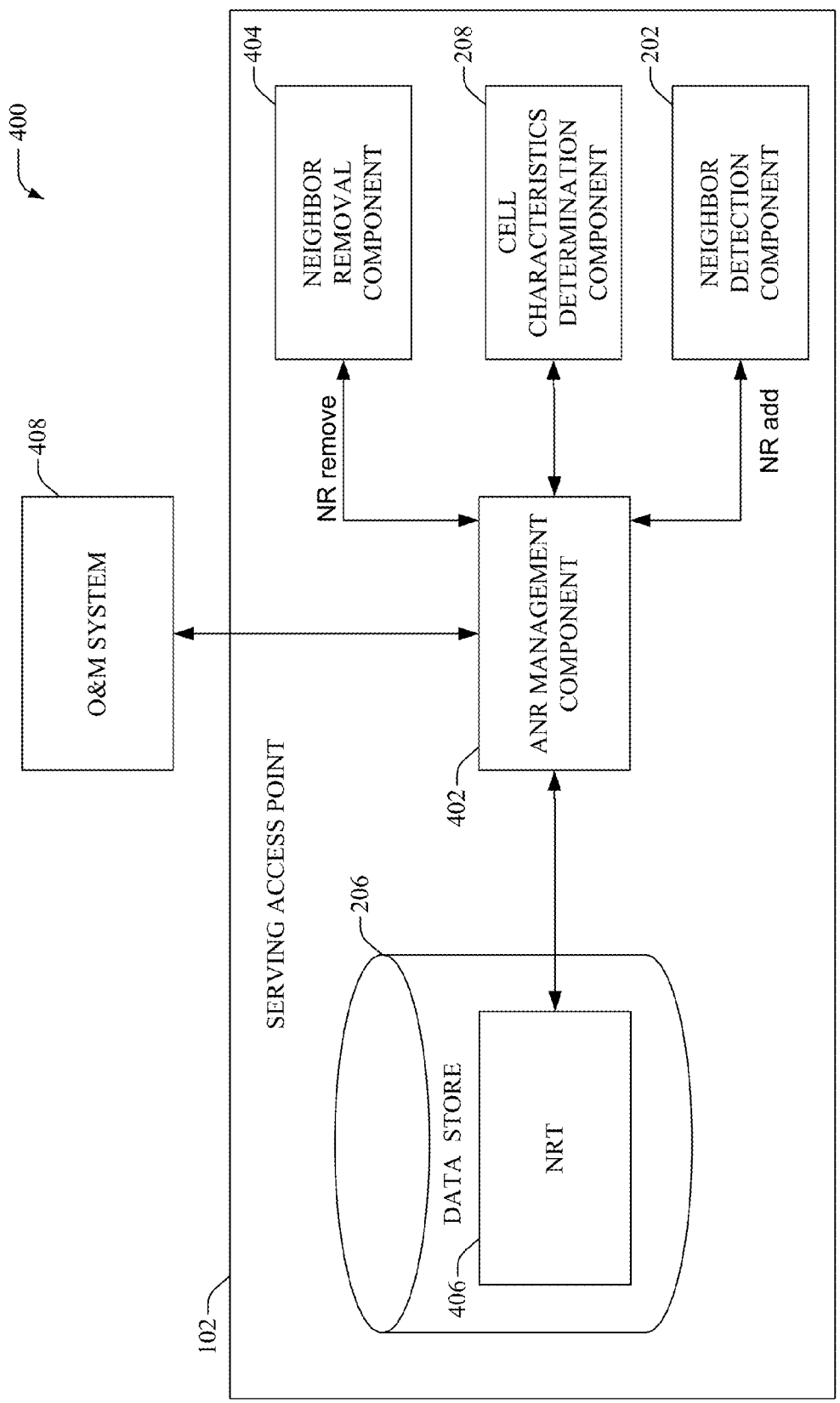
FIG. 4 illustrates an example system that facilitates management of neighbor relations.

FIG. 4 illustrates an example system 400 that facilitates management of neighbor relations in accordance with an aspect of the subject disclosure. It can be noted that the serving access point 102, the neighbor detection component 202, and the cell characteristics determination component 208 can include functionality as more fully described herein, for example, as described above with regard to systems 100-375.

In one aspect, the serving access point 102 includes an ANR management component 402 that can manage neighbor relations between the serving access point 102 and its neighboring access points (e.g., neighbor access point 104). Based on data received from the neighbor detection component 202, the cell characteristics determination component 208, and a neighbor removal component 404, the ANR management component 402 can store, update, and/or remove information associated with the neighboring access points within/from a neighbor relation table (NRT) 406. As an example, the neighbor detection component 202 finds new neighboring access points based on RRC signaling with UE(s) served by serving access point 102. The ANR management component 402 can store identifier data (e.g., target cell identifier (TCI)) representing the neighboring access points detected by the neighbor detection component 202 in the NRT 406. Further, in one example, the ANR management component 402 can request and receive cell characteristic data associated with the neighboring access points from the cell characteristics determination component 208. As an example, the cell characteristics determination component 208 can obtain the cell characteristic data from the neighboring access points (e.g., via an X2 interface), from a network management device, and/or via historical information received from UE(s) served by serving access point 102 as explained in detail supra with respect to systems 300, 350, and 375. In one aspect, the ANR management component 402 can store the received cell characteristic data in the NRT 406.

According to an embodiment, the neighbor removal component 404 can determine when and/or which neighbor relation (NR) is to be removed from the NRT 406. As an example, neighbor removal component 404 can select access points to be removed if the NR associated with the access point has not been utilized for a defined time period and/or if a handover timer associated with the NR has expired. On receiving removal instructions from the neighbor removal component 404, the ANR management component 402 can delete the entry associate with the NR from the NRT 406. Additionally or alternatively, an operations and maintenance (O&M) system 408 (e.g., within the communication network) can control the ANR management component 402 to facilitate management of the NRT 406. As an example, the O&M system 408 can add, update, and/or delete NRs. Further, the O&M system 408 can also modify the fields/attributes of the NRT 406. In one aspect, the ANR management component 402 can inform the O&M system 408 about any modifications to the NRT 406.

Tables 1 and 2 depicted below illustrate example NRTs 406 that store cell characteristic data including, but not limited to cell-type and/or cell profile data associated with a set of N neighboring access points (e.g., wherein N can be most any positive integer). It is noted that although illustrated as separate tables, the cell-type and/or cell profile data can be provided in the same table. Further, it is noted that the NRT 406 can have fewer or greater number of rows/columns that those illustrated in example Tables 1 and 2 and that the NRT 406 can be represented as most any data structure. Furthermore, location data specifying an indoor or outdoor location is illustrated in the cell profile data of Table 2; however it is noted that the subject specification is not limited to location data and that most any cell characteristic data (e.g., antenna tilt/pattern, power level, MIMO configuration, carrier aggregation, public/private access, capacity, number and/or types of technologies supported, etc.) can be added to the cell profile data of Table 2.

TABLE 1

| NR | TCI | No Remove | No HO | No X2 | Cell-type |
|----|-----|-----------|-------|-------|-----------|
| 1 | TCI#1 | | | | Metro |
| 2 | TCI#2 | Yes | | Yes | Metro |
| 3 | TCI#3 | Yes | | | Macro |
| . | . | . | . | . | . |
| . | . | . | . | . | . |
| . | . | . | . | . | . |
| N | TCI#N | | | | Femto |

TABLE 2

| NR | TCI | No Remove | No HO | No X2 | Cell Profile data |
|---|---|---|---|---|---|
| 1 | TCI#1 | | | | indoor |
| 2 | TCI#2 | Yes | | Yes | outdoor |
| 3 | TCI#3 | Yes | | | outdoor |
| . | . | . | . | . | . |
| . | . | . | . | . | . |
| . | . | . | . | . | . |
| N | TCI#N | | | | indoor |

As an example, the "TCI" field provides identifiers, such as, but not limited to, E-UTAN Cell Global Identifier (ECGI) and/or Physical Cell Identifier (PCI) of the neighboring access points. The "No remove" field, if set, indicates that the NR data associated with the particular access point is not to be removed from the NRT 406, for example, even though the removal conditions have been satisfied. The "No HO" field, if set, indicates that the particular access point is not to be utilized by the serving access point 102 for handovers. Further, the "No X2" field, if set, indicates that the an X2 interface is not to be utilized to initiate procedures towards particular access point.

Figure 5:
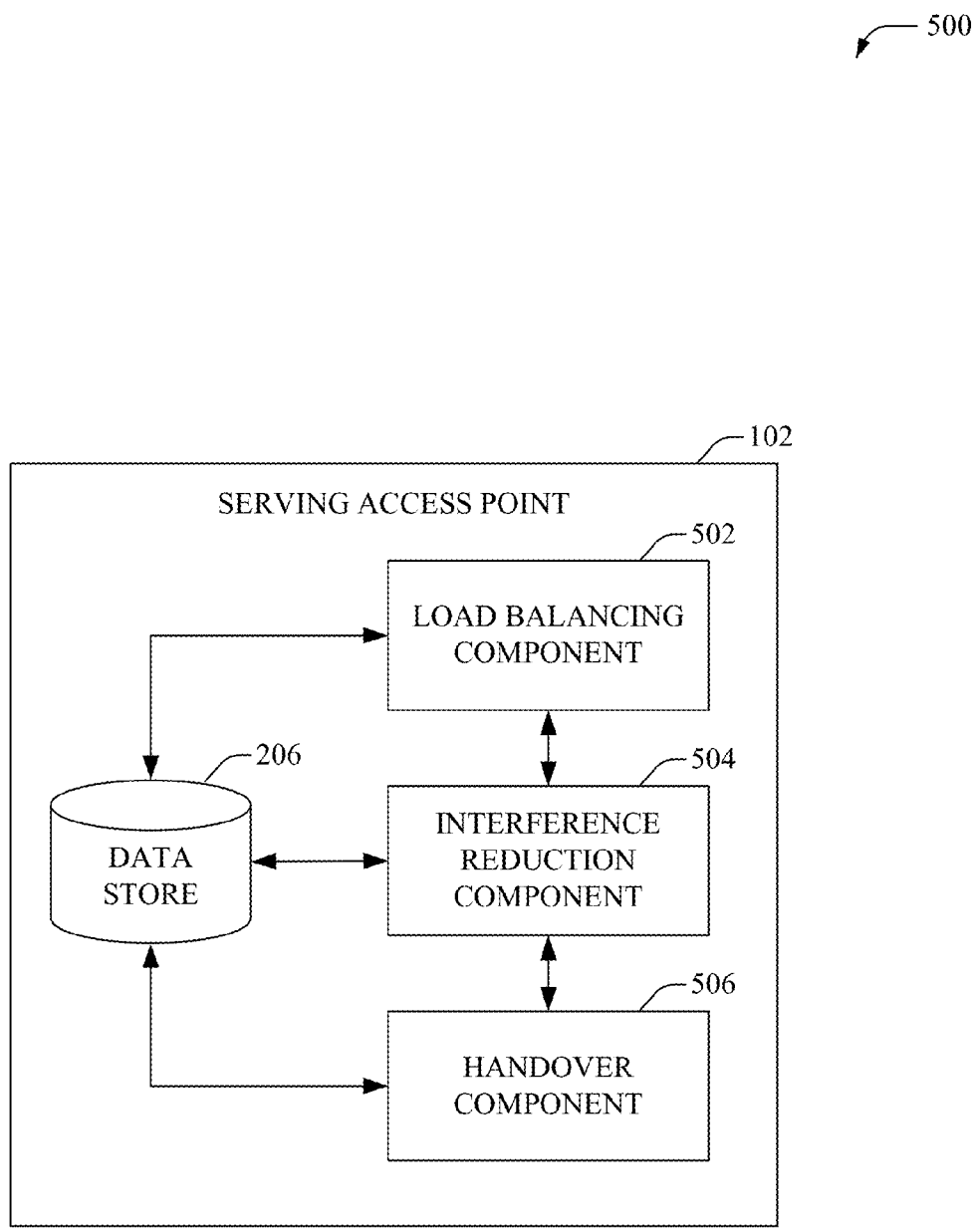
FIG. 5 illustrates an example system that facilitates utilization of cell characteristic data for prioritizing neighbor access points.

FIG. 5 illustrates an example system 500 that facilitates utilization of cell characteristic data for prioritizing neighbor access points, according to an aspect of the subject disclosure. It can be noted that the serving access point 102 and the data store 206 can include functionality as more fully described herein, for example, as described above with regard to systems 1-400. In one aspect, the cell characteristic data stored in data store 206 can be utilized for load balancing between cells via a load balancing component 502, inter-cell interference coordination (ICIC) via an interference reduction component 504, and/or HO of UE between cells via a handover component 506.

According to an example scenario, the load balancing component 502 can utilize carrier aggregation data to improve load balancing performance. Accordingly, if the load balancing component 502 determines that a first neighbor cell supports aggregation of more carriers than a second neighbor cell (or the second neighbor cell does not support carrier aggregation), the load balancing component 502 can transfer a carrier aggregation capable UE to the first neighbor cell and transfer a non-carrier aggregation capable UE to the second cell. This can improve user experience and facilitate efficient utilization of network resources. In another example, the load balancing component 502 can utilize MIMO configuration data to rank/prioritize neighbor cells. For example, the load balancing component 502 can direct UEs that support a high order of MIMO to neighbor cells having a high order of MIMO antenna configurations and UEs that support a low order of MIMO to neighbor cells having a low order of MIMO antenna configurations. In yet another example, the load balancing component 502 can offload more traffic to a neighbor cell that supports multi-technology (e.g., cellular and WiFi). According to an embodiment, the load balancing component 502 can determine, based on the cell characteristic data, a load balancing parameter that represents a load percentage of a target cell (e.g., neighbor access point 104). Moreover, different cells (e.g., small cells, macro cells, femtocells, etc.) can support different cell capacities (e.g., number of users/devices). For example, a macrocell determined to have 60% load can accept a larger number of incoming UEs compared to a 60% loaded small cell. When the load balancing component 502 facilitates load balancing to direct/steer/offload UE to the target cell, the load balancing component 502 can interpret load percentage based on cell-type data and set different criteria for a number of UEs that are to be offloaded based on the cell-type data.

In another example scenario, antenna tilt/pattern and/or power level information can be utilized by the interference reduction component 504 to facilitate ICIC. In yet another example scenario, location data (e.g., indoor or outdoor location) associated with a set of neighbor access points stored in the data store 206 can be utilized by the handover component 506. For example, the handover component 506 can limit some of the handovers between indoor and outdoor cell, for example, to avoid ping-pong between indoor and outdoor cells. Additionally or alternatively, the handover component 506 can prioritize/block neighbors based on an indoor/outdoor policy, for example, specified by a service provider/network operator. In another example, the handover component 506 can limit some of the handovers to neighbors that are privately owned and/or are not publically accessible (e.g., unless verified that the UE is authorized to access the private neighbor cell).

Further, it is noted that the cell characteristic data can be utilized for cell reselection during idle mode of operation of a UE served by serving access point 102 (e.g., when the UE is not performing an ongoing communication session) and/or for a handover and/or load balancing during a connected mode of operation of the UE (e.g., when the UE is performing one or more ongoing communication sessions). Additionally or alternatively, the cell reselection parameters disclosed herein can include technology category based parameters that can be utilized to trigger a UE to switch from one technology to another. As the HetNet evolves, the number of different technologies (e.g., cellular, WiFi, near field communication (NFC), Bluetooth™, etc.) utilized within the HetNet can increase. In one example, when a UE is served by LTE, the handover component 506 can apply different triggers for sending the UE to Wi-Fi or NFC or other technologies based on different trigger criteria.

It is noted that the above scenarios describe only a few examples of how the characteristic data can be utilized by the load balancing component 502, interference reduction component 504, and/or handover component 506, and that the subject specification is not limited to these examples. Further, the load balancing component 502, interference reduction component 504, and/or handover component 506 can utilize the characteristic data based on most any network-defined policy received via a network device (not shown). Although depicted as completely residing within the serving access point 102, it is noted that the load balancing component 502, interference reduction component 504, and/or handover component 506 can be distributed among multiple devices, such as, but not limited to, a network device and/or a UE (not shown).

Figure 6:
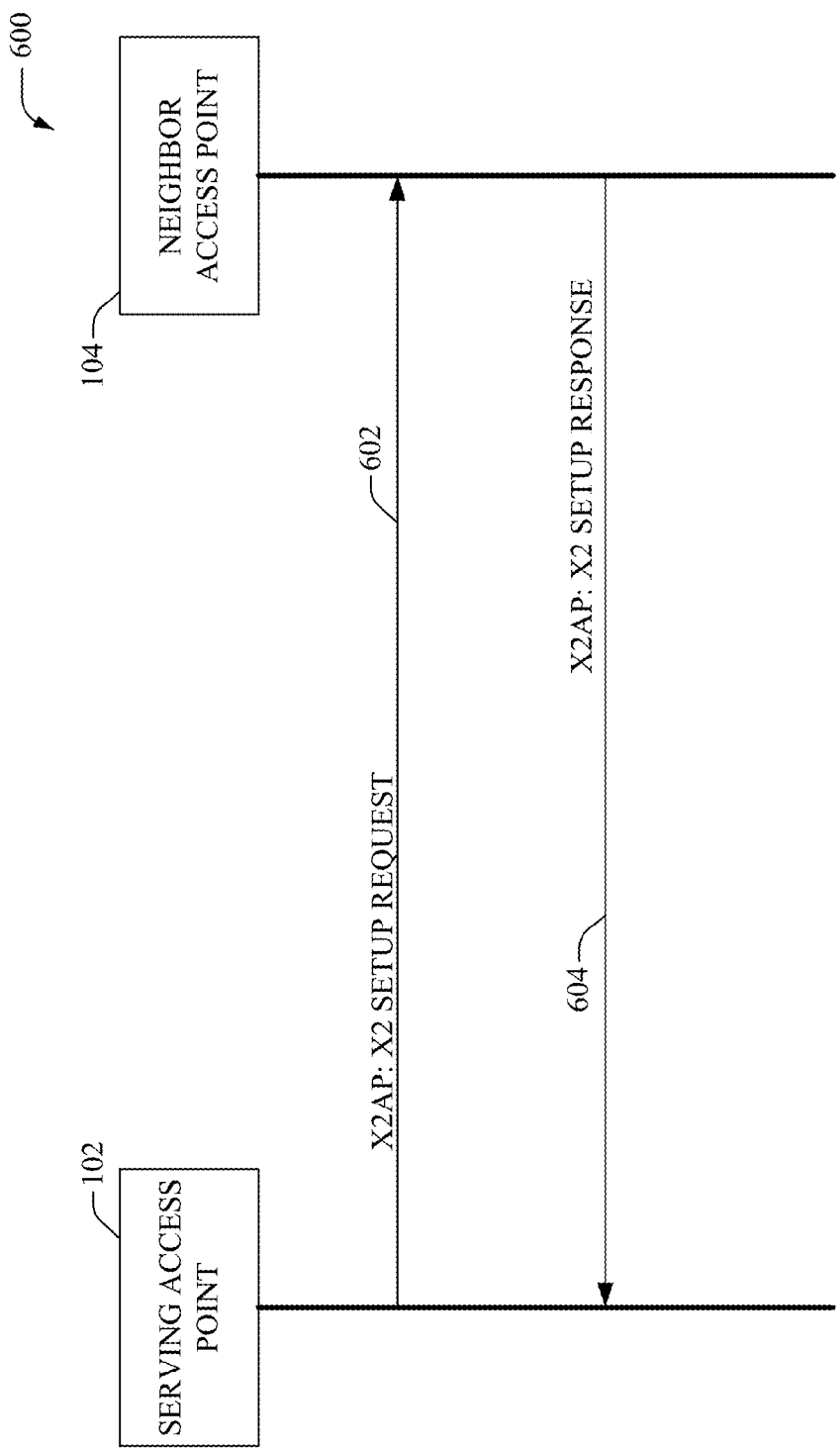
FIG. 6 illustrates an example flow diagram that depicts a transfer of cell characteristic data between access points in a long term evolution (LTE) network.

FIG. 6 illustrates an example flow diagram 600 that depicts a transfer of cell characteristic data between access points in an LTE network. In this example scenario, serving access point 102 and the neighbor access point 104 are eNBs in an LTE communication network. It can be noted that the serving access point 102 and the neighbor access point 104 can include functionality as more fully described herein, for example, as described above with regard to systems 100-500. As an example, the serving access point 102 and the neighbor access point 104 can communicate via an X2AP to exchange cell characteristic data.

At 602, the serving access point 102 can transmit an X2 setup Request to the neighbor access point 104 (e.g., identified by data in the NRT 406) to initiate establishment of an X2 interface between the serving access point 102 and the neighbor access point 104. In one aspect, the X2 setup Request can include (or be appended with) cell characteristic/capability data associated with the serving access point 102. For example, the X2 setup Request can include information, such as, but not limited to, cell-type, antenna tilt/pattern, power level, MIMO configuration, carrier aggregation, public/private access, capacity, number and/or types of technologies supported by the serving access point 102. Further, the X2 setup Request can include information to configure the X2 interface. In one example, the X2 setup Request can be transmitted at most any time, for example, on detection of the neighbor access point 104 (e.g. by neighbor detection component 202). On receiving the X2 Setup Request, the neighbor access point 104 can facilitate establishment of the X2 interface based on the configuration information and at 604, transmit an X2 setup response to the serving access point 102. In one aspect, the X2 setup Response can include (or be appended with) cell characteristic/capability data associated with the neighbor access point 104. For example, the X2 setup Response can include information, such as, but not limited to, cell-type, antenna tilt/pattern, power level, MIMO configuration, carrier aggregation, public/private access, capacity, number and/or types of technologies supported by the neighbor access point 104. Subsequent to establishment, the X2 interface can be utilized to facilitate direct communications (e.g., updates to the characteristic/capability data) between the serving access point 102 and the neighbor access point 104. Further, the characteristic/capability data exchanged between the serving access point 102 and the neighbor access point 104 can be utilized to facilitate load balancing, handover decisions and/or Inter-cell interference coordination (ICIC).

Figure 7:
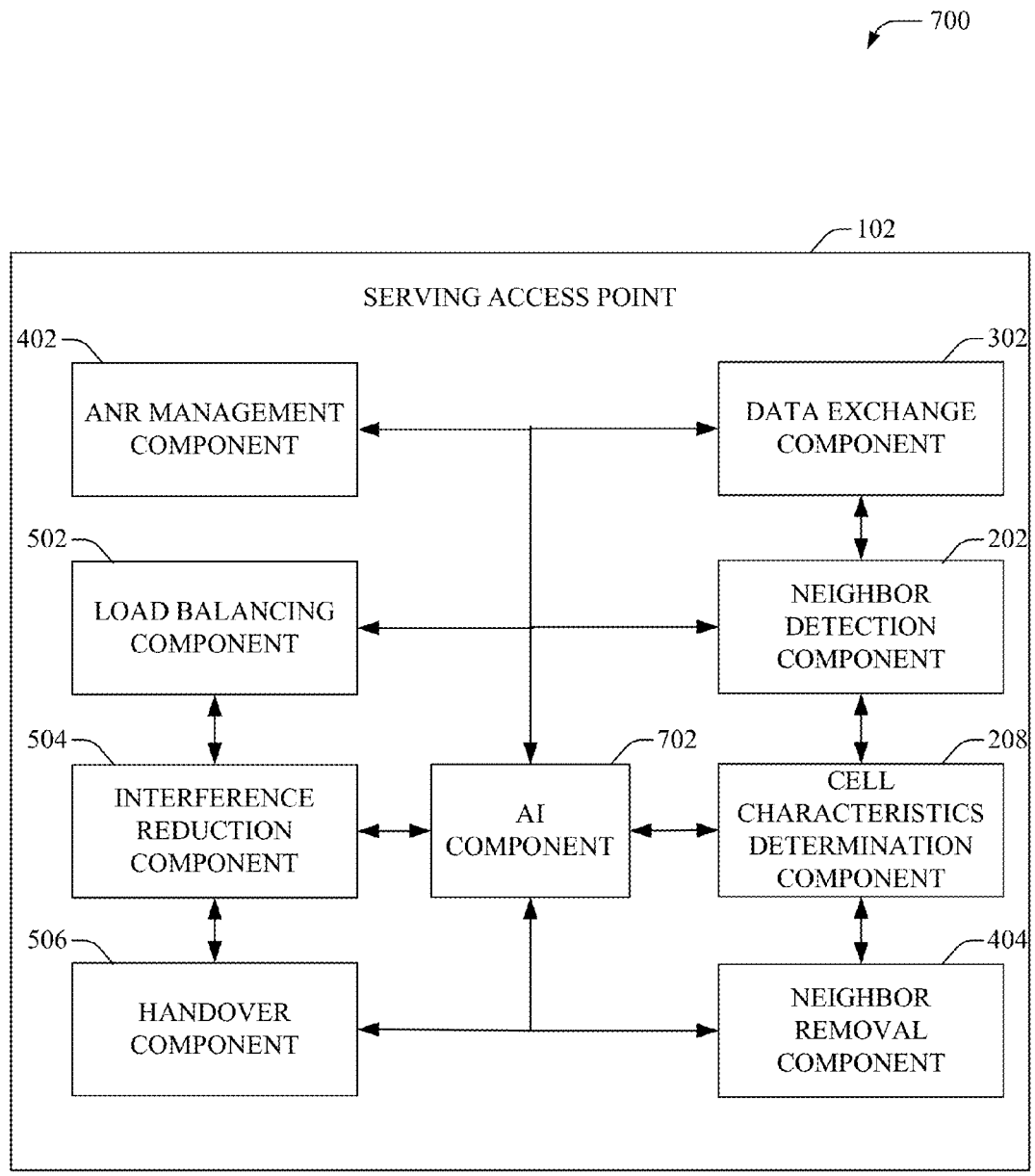
FIG. 7 illustrates an example system that facilitates automating one or more features in accordance with the subject embodiments.

Referring now to FIG. 7, there illustrated is an example system 700 that employs one or more artificial intelligence (AI) components (702), which facilitate automating one or more features in accordance with the subject embodiments. It can be appreciated that the serving access point 102, the neighbor detection component 202, the cell characteristics determination component 208, the data exchange component 302, the ANR management component 402, the neighbor removal component 404, the load balancing component 502, the interference reduction component 504, and the handover component 506 can include respective functionality, as more fully described herein, for example, with regard to systems 100-600.

In an example embodiment, system 700 (e.g., in connection with determination and utilization of cell characteristic data etc.) can employ various AI-based schemes for carrying out various aspects thereof. For example, a process for determining an optimal time/schedule to receive/update the cell characteristic data, load balancing, interference reduction, handover decisions, etc. can be facilitated via an automatic classifier system implemented by AI component 702. A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from UEs and/or access points, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing access point/UE behavior, user/operator preferences or policies, historical information, receiving extrinsic, type of UE, etc.). For example, SVMs can be configured via a learning or training phase within a classifier constructor and feature selection module. Thus, the classifier(s) of AI component 702 can be used to automatically learn and perform a number of functions, including but not limited to determining according to a predetermined criteria a schedule according to which the cell characteristic data is to be received/updated, a policy for storing the cell characteristic data, prioritizing/ranking the neighboring access points, etc. The criteria can include, but is not limited to, historical patterns and/or trends, user preferences, service provider preferences and/or policies, location of the access point, current time, access preferences (e.g., public or private) of the serving access point 102 and/or neighbor access points, network load, cell characteristic data, and the like.

Figure 8:
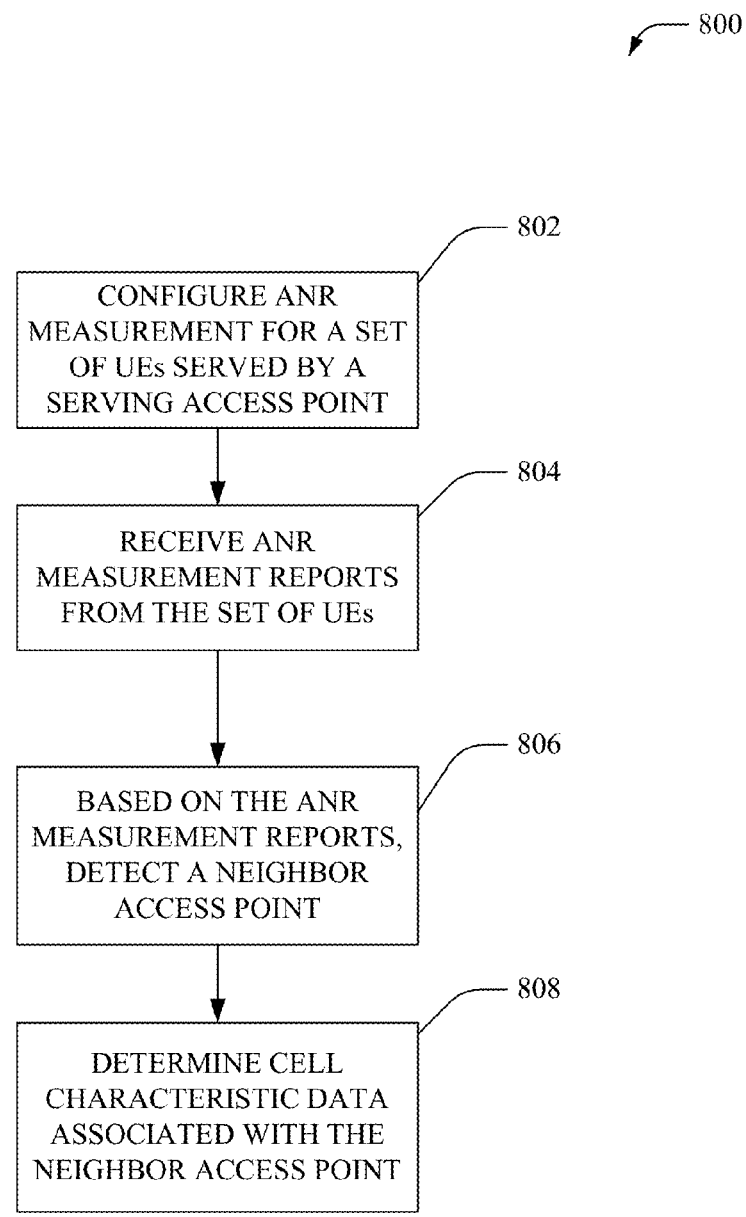
FIG. 8 illustrates an example method that facilitates determination of cell characteristic data.
Figure 9:
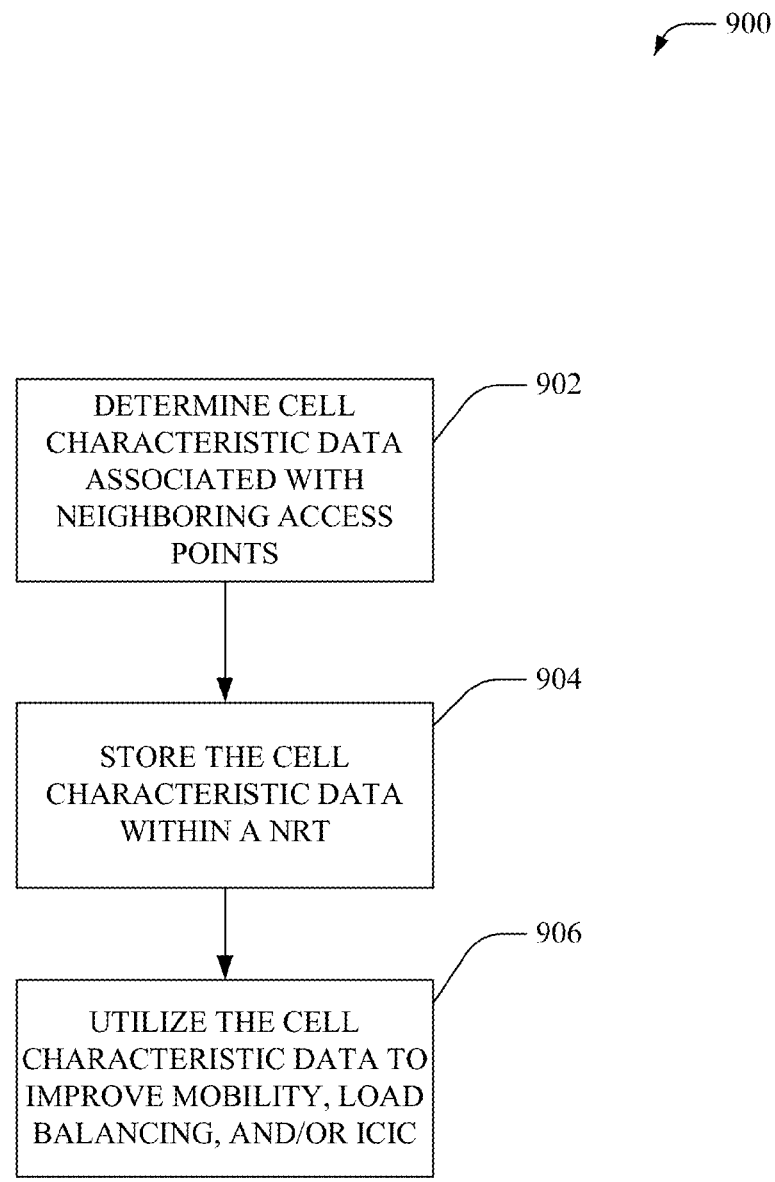
FIG. 9 illustrates an example method that facilitates utilization of cell characteristic data to support heterogeneous networks (HetNets).

FIGS. 8-9 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8, illustrated is an example method 800 that facilitates determination of cell characteristic data, according to an aspect of the subject disclosure. As an example, method 800 can be implemented by one or more network devices of a RAN, for example, a serving access point (e.g., base station, eNB, HNB, HeNB, etc.) In another example, method 800 can be implemented (at least partially) by one or more devices of a core mobility network (e.g., a network management system).

At 802, an ANR measurement can be configured for a set of UEs served by the serving access point. As an example, configuration data can be transmitted to the set of UEs via RRC signaling. The configuration data can trigger ANR measurements by the set of UEs, which can report the results of the measurements to the serving access point. At 804, the ANR measurement reports can be received from the set of UEs. At 806, a neighbor access point can be detected based on the ANR measurement reports. Further, at 808, cell characteristic data associated with neighbor access point can be determined. As an example, the cell characteristic data can include information, such as, but not limited to a cell-type data (e.g., that represents capabilities/features/characteristics of a cell) and/or cell-profile data (e.g., antenna tilt/pattern, power level, MIMO configuration, carrier aggregation, indoor/outdoor location, public/privately owned, cell capacity, multi-technology support, etc.). In one aspect, the cell characteristic data can be received via an X2 interface (e.g., as part of a setup message and/or subsequent to the setup of the X2 interface). In another aspect, the cell characteristic data can be received via one or more network devices, for example, within the RAN and/or core mobility network. In yet another example, the cell characteristic data can be extracted from enhanced UE history information received from the set of UEs. The cell characteristic data can be utilized to facilitate load balancing, mobility and/or ICIC.

FIG. 9 illustrates an example method 900 that facilitates utilization of cell characteristic data to support HetNets, according to an aspect of the subject disclosure. As an example, method 900 can be implemented by one or more network devices of a RAN, for example, a serving access point (e.g., base station, eNB, HNB, HeNB, etc.) In another example, method 800 can be implemented (at least partially) by one or more devices of a core mobility network (e.g., a network management system). At 902, cell characteristic data (e.g., cell-type, antenna tilt/pattern, power level, MIMO configuration, carrier aggregation, indoor/outdoor location, public/privately owned, cell capacity, multi-technology support, etc.) associated with neighboring access points can be determined. In one aspect, the cell characteristic data can be received via X2 interfaces (e.g., as part of a setup message and/or subsequent to the setup of the X2 interface) between the serving access point and the neighboring access points. In another aspect, the cell characteristic data can be received via one or more network devices, for example, within the RAN and/or core mobility network. In yet another example, the cell characteristic data can be extracted from enhanced UE history information received from a set of UE coupled to the serving access point. At 904, the cell characteristic data can be stored within an NRT. Further, at 906, cell characteristic data can be utilized to facilitate load balancing, mobility and/or ICIC.

Figure 10:
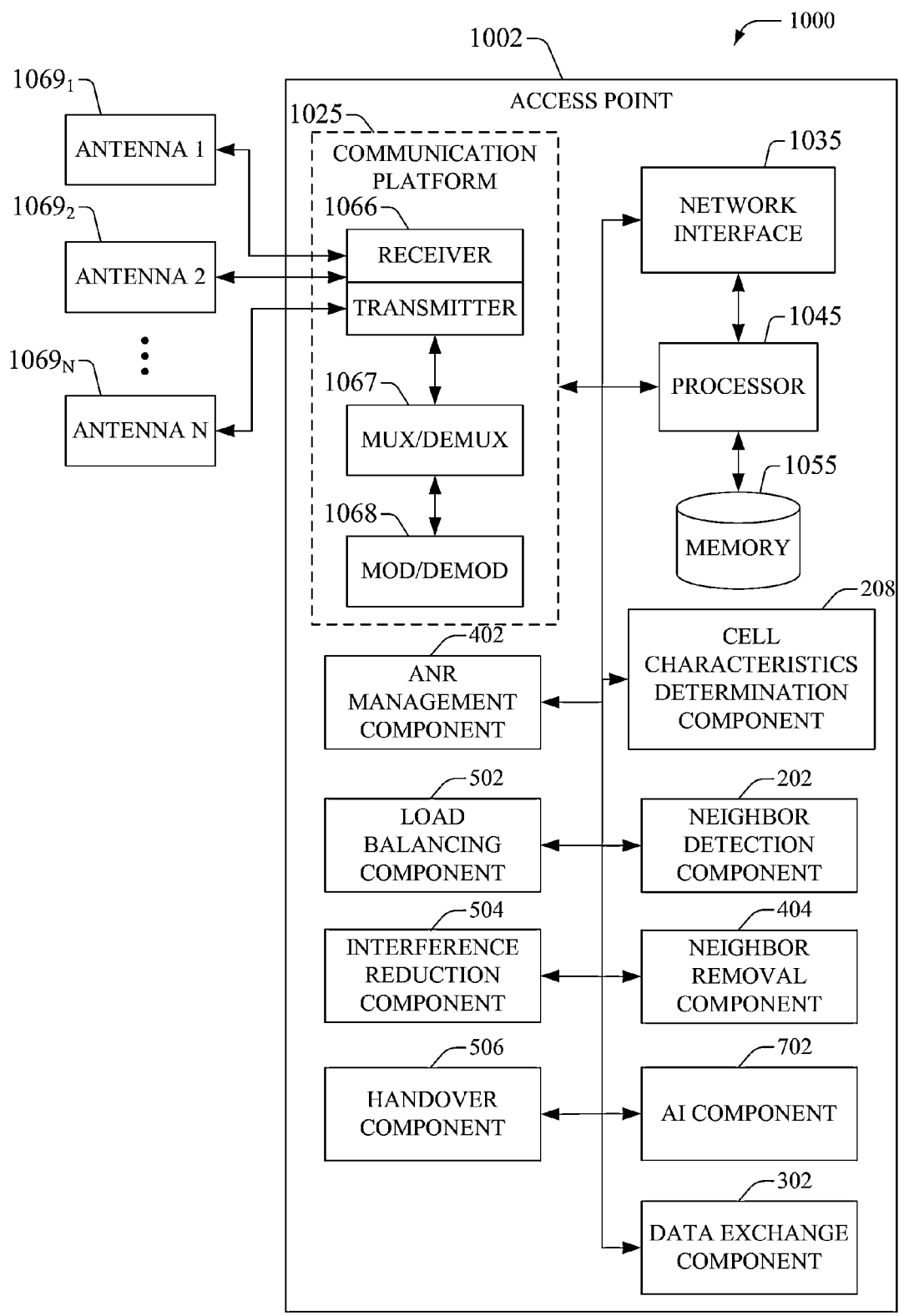
FIG. 10 illustrates an example block diagram of an access point suitable for determining and/or storing cell characteristic data.
Figure 11:
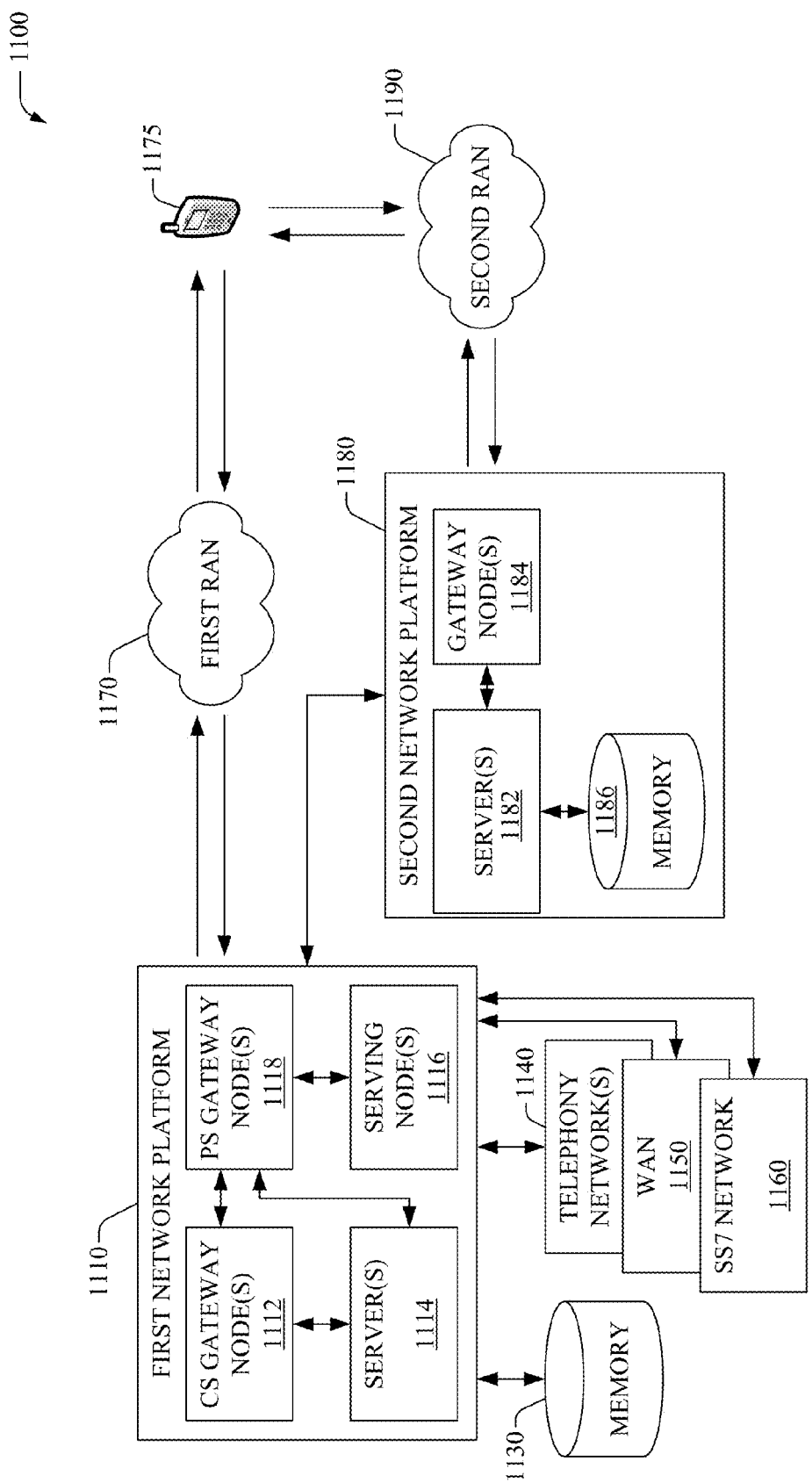
FIG. 11 illustrates an example wireless communication environment for transferring cell characteristic data between access points.

To provide further context for various aspects of the subject specification, FIGS. 10 and 11 illustrate, respectively, a block diagram of an example embodiment 1000 of an access point that facilitates determination and/or storage of cell characteristic data and a wireless communication environment 1100, with associated components for efficient transfer of cell characteristic data in accordance with aspects described herein.

With respect to FIG. 10, in example embodiment 1000 comprises an access point 1002. As an example, the serving access point 102 and/or the neighbor access points 104 disclosed herein with respect to systems 100-700 can each include at least a portion of the access point 1002. In one aspect, the access point 1002 can receive and transmit signal(s) (e.g., traffic and control signals) from and to wireless devices, access terminals, wireless ports and routers, etc., through a set of antennas $1069_1$-$1069_N$. It should be appreciated that while antennas $1069_1$-$1069_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 can include a transmitter/receiver (e.g., a transceiver) 1066 that can convert signal(s) from analog format to digital format (e.g., analog-to-digital conversion) upon reception, and from digital format to analog (e.g., digital-to-analog conversion) format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and/or frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Access point 1002 also includes a processor 1045 configured to confer functionality, at least partially, to substantially any electronic component in the access point 1002, in accordance with aspects of the subject disclosure. In particular, processor 1045 can facilitates implementing configuration instructions received through communication platform 1025, which can include storing data in memory 1055. In addition, processor 1045 facilitates processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beamforming or selective radiation pattern formation, which can benefit specific locations covered by the access point 1002; and exploit substantially any other advantages associated with smart-antenna technology. Memory 1055 can store data structures, code instructions, system or device information like device identification codes (e.g., International Mobile Station Equipment Identity (IMEI), Mobile Station International Subscriber Directory Number (MSISDN), serial number . . . ) and specification such as multimode capabilities; code sequences for scrambling; spreading and pilot transmission, floor plan configuration, access point deployment and frequency plans; and so on. Moreover, memory 1055 can store configuration information such as schedules and policies; geographical indicator(s); cell characteristic data (e.g., of access point 1002 and/or neighboring access points), NRT, historical logs, and so forth. In one example, data store 206 can be implemented in memory 1055.

In embodiment 1000, processor 1045 can be coupled to the memory 1055 in order to store and retrieve information necessary to operate and/or confer functionality to communication platform 1025, network interface 1035 (e.g., that coupled the access point to core network devices such as but not limited to a network controller), and other operational components (e.g., multimode chipset(s), power supply sources . . . ; not shown) that support the access point 1002.

The access point 1002 can further include the neighbor detection component 202, the cell characteristics determination component 208, the data exchange component 302, the ANR management component 402, the neighbor removal component 404, the load balancing component 502, the interference reduction component 504, the handover component 506, and the AI component 702, which can include functionality, as more fully described herein, for example, with regard to systems 100-700. In addition, it is to be noted that the various aspects disclosed in the subject specification can also be implemented through (i) program modules stored in a computer-readable storage medium or memory (e.g., memory 1055) and executed by a processor (e.g., processor 1045), or (ii) other combination(s) of hardware and software, or hardware and firmware.

Referring now to FIG. 11, there illustrated is a wireless communication environment 1100 (e.g., HetNet) that includes two wireless network platforms: (i) A first network platform 1110 (e.g., macro network platform) that serves, or facilitates communication with UE 1175 via a first RAN 1170. As an example, in cellular wireless technologies (e.g., 3GPP UMTS, HSPA, 3GPP LTE, 3GPP UMB, 4G LTE, etc.), the first network platform 1110 can be embodied in a Core Network; and (ii) A second network platform 1180 (e.g., macro network platform, femto network platform, wireless local area network (WLAN) platform, etc.), which can provide communication with UE 1175 through a second RAN 1190 linked to the second network platform 1180. It should be noted that the second network platform 1180 can offload UE 1175 from the first network platform 1110, once UE 1175 attaches (e.g., based on the per category reselection parameters described herein) to the second RAN. In one example, the first RAN and the second RAN can be commonly operated and/or deployed by a common service provider. Further, it can be noted that in one example (not shown) the second RAN 1190 can be directly coupled to the first network platform 1110.

It is noted that RAN (1170 and/or 1190) includes base station(s), or access point(s), and its associated electronic circuitry and deployment site(s), in addition to a wireless radio link operated in accordance with the base station(s). Accordingly, the first RAN 1170 can comprise various access points like serving access point 102, while the second RAN 1190 can comprise multiple access points like neighbor access point 104. Moreover, the UE 1175 can be substantially similar to and include functionality associated with UEs 204 and/or UE 308 described herein.

Both the first and the second network platforms 1110 and 1180 can include components, e.g., nodes, gateways, interfaces, servers, or platforms, that facilitate packet-switched (PS) and/or circuit-switched (CS) traffic (e.g., voice and data) and control generation for networked wireless communication. For example, the first network platform 1110 includes CS gateway node(s) 1112 which can interface CS traffic received from legacy networks like telephony network(s) 1140 (e.g., public switched telephone network (PSTN), or public land mobile network (PLMN)) or a SS7 network 1160. Moreover, CS gateway node(s) 1112 interfaces CS-based traffic and signaling and gateway node(s) 1118. In addition to receiving and processing CS-switched traffic and signaling, gateway node(s) 1118 can authorize and authenticate PS-based data sessions with served (e.g., through the first RAN 1170) wireless devices. Data sessions can include traffic exchange with networks external to the first network platform 1110, like wide area network(s) (WANs) 1150; it should be appreciated that local area network(s) (LANs) can also be interfaced with first network platform 1110 through gateway node(s) 1118. Gateway node(s) 1118 generates packet data contexts when a data session is established. It should be further appreciated that the packetized communication can include multiple flows that can be generated through server(s) 1114. The first network platform 1110 also includes serving node(s) 1116 that conveys the various packetized flows of information or data streams, received through gateway node(s) 1118. It is to be noted that server(s) 1114 can include one or more processors configured to confer at least in part the functionality of first network platform 1110. To that end, one or more processors can execute code instructions stored in memory 1130 or other computer-readable medium, for example.

In example wireless environment 1100, memory 1130 can store information related to operation of first network platform 1110. Information can include business data associated with subscribers; market plans and strategies, e.g., promotional campaigns, business partnerships; operational data for mobile devices served through first network platform; service and privacy policies; end-user service logs for law enforcement; and so forth. Memory 1130 can also store information from at least one of telephony network(s) 1140, WAN(s) 1150, or SS7 network 1160. Many different types of information can be stored in memory 1130 without departing from example embodiments.

Gateway node(s) 1184 can have substantially the same functionality as PS gateway node(s) 1118. Additionally or optionally, the gateway node(s) 1184 can also include substantially all functionality of serving node(s) 1116. In an aspect, the gateway node(s) 1184 can facilitate handover resolution, e.g., assessment and execution. Server(s) 1182 have substantially the same functionality as described in connection with server(s) 1114 and can include one or more processors configured to confer at least in part the functionality of the first network platform 1110. In one example, the network management system 304 and/or O&M system 408 can be implemented or executed by server(s) 1182 and/or server(s) 1114. To that end, the one or more processor can execute code instructions stored in memory 1186, for example.

Memory 1186 can include information relevant to operation of the various components of the second network platform 1180. For example operational information that can be stored in memory 1186 can comprise, but is not limited to, subscriber information; contracted services; maintenance and service records; cell configuration (e.g., devices served through second RAN 1190; access control lists, or white lists); service policies and specifications; privacy policies; add-on features; and so forth.

Figure 12:
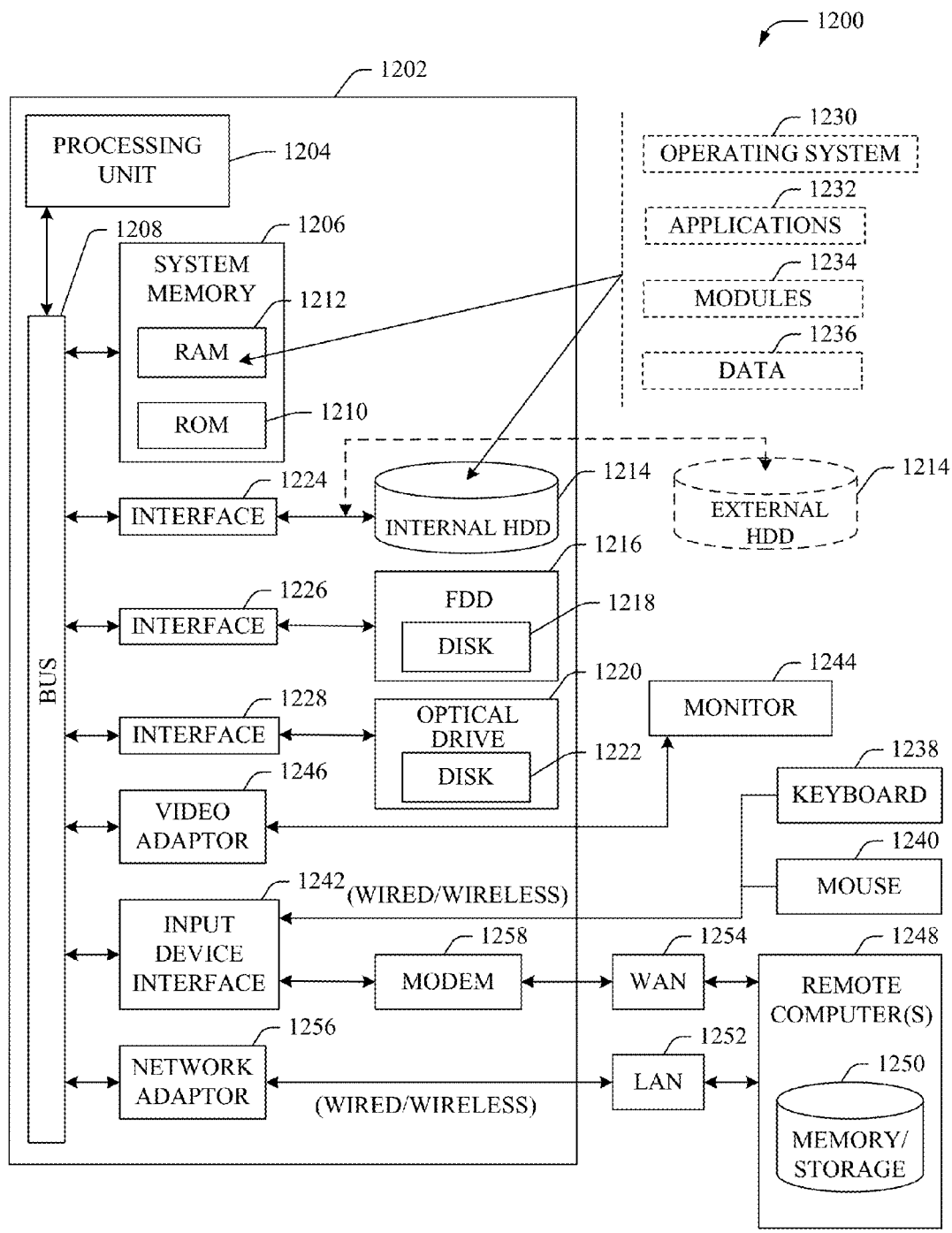
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the component(s), server(s), equipment, system(s), and/or device(s) (e.g., serving access point 102, neighbor access point 104, neighbor detection component 202, cell characteristics determination component 208, data store 206, UEs 204, data exchange component 302, network management system 304, network management data store 306, UE 308, ANR management component 402, neighbor removal component 404, O&M system 408, load balancing component 502, interference reduction component 504, and handover component 506, AI component 702, access point 1002, first network platform 1110, second network platform 1180, etc.) disclosed herein with respect to system 100-700 and 1000-1100 can each include at least a portion of the computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated, but which may be integrated into UE 204 in some embodiments). These and other input devices are often connected to the processing unit 1204 through an input device interface 1242 that is coupled to the system bus 1208, but can be connected by other interfaces, such as a parallel port, an IEEE 1394 serial port, a game port, a USB port, an infrared (IR) interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:

initiating an establishment of a peer-to-peer link between a first access point device and a second access point device, responsive to the initiating, receiving classification data representing a type of the first access point device, and initiating storage of the classification data to a neighbor relation data store of the second access point device, wherein the classification data is employable to facilitate cell reselection associated with a user equipment served by the second access point device.

2. The system of claim 1, wherein the type is selected from a macro cell access point device, a femtocell access point device, a metro cell access point device, or a pico cell access point device.

3. The system of claim 1, wherein the classification data is first classification data, the type is a first type, and the operations further comprise:

as part of the establishment, facilitating a transmission of second classification data to the second access point device, and wherein the second classification data represents a second type of the second access point device.

4. The system of claim 3, wherein the neighbor relation data store is a first neighbor relation data store is and the operations further comprise:

initiating storage of the second classification data to a second neighbor relation data store of the first access point device.

5. The system of claim 1, wherein the operations further comprise:

as part of the establishment, receiving characteristic data representing a capability associated with a first access point device, and initiating storage of the characteristic data to the neighbor relation data store.

6. The system of claim 5, wherein the characteristic data comprises antenna data associated with a set of antenna of the first access point device.

7. The system of claim 1, wherein the first access point device and the second access point device are part of a heterogeneous network.

8. The system of claim 1, wherein the first access point device and the second access point device are part of a self-optimizing network.

9. The system of claim 1, wherein the first access point device and the second access point device are determined to be located within a defined distance from each other.

10. The system of claim 1, wherein a first coverage are of the first access point device and a second coverage area of the second access point device are determined to overlap.

11. The system of claim 1, wherein the first access point device and the second access point device are determined to share a common cell edge.

12. The system of claim 1, wherein the operations further comprise:

determining the first access point device based on measurement information received from the user equipment served by the second access point device.

13. The system of claim 1, wherein the operations further comprise:

determining the first access point device based on information received from a management network device.

14. A method, comprising:

during an establishment of a peer-to-peer link between a first access point device and a second access point device, determining, by a system comprising a processor, classification data representing a type of the first access point device; and based on the classification data, populating, by the system, a neighbor relation table stored within a data store of the second access point device, wherein the neighbor relation table is employable to facilitate cell reselection for a mobile device served by the second access point device.

15. The method of claim 14, further comprising:

during the establishment, determining, by the system, capacity data representing a number of user equipment supported by the first access point device, wherein the capacity data is to be stored within the data store.

16. The method of claim 14, further comprising:

selecting, by the system, the first access point device based on measurement information received from a user equipment served by the second access point device.

17. The method of claim 14, further comprising:

selecting, by the system, the first access point device based on information received from a management network device.

18. A non-transitory machine-readable storage medium comprising executable instructions that, when executed by a processor, facilitate performance of operations, comprising:

based on message data exchanged between a first access point device and a second access point device to establish a peer-to-peer link, determining classification data representing a type of the first access point device; and based on the classification data, updating a neighbor relation data structure stored within a data store of the second access point device, wherein the neighbor relation data structure is to be utilized to facilitate cell reselection for a user equipment served by the second access point device.

19. The non-transitory machine-readable storage medium of claim 18, wherein the message data is exchanged by employing a control plane protocol.

20. The non-transitory machine-readable storage medium of claim 18, wherein the message data is exchanged by employing an X2 application protocol.

* * * * *